(12) United States Patent
De Hoogh et al.

(10) Patent No.: US 11,818,245 B2
(45) Date of Patent: *Nov. 14, 2023

(54) CRYPTOGRAPHIC DEVICE AND METHOD

(71) Applicant: KONINKLIJKE PHILIPS N.V., Eindhoven (NL)

(72) Inventors: Sebastiaan Jacobus Antonius De Hoogh, Oosterhout (NL); Ronald Rietman, Eindhoven (NL); Ludovicus Marinus Gerardus Maria Tolhuizen, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,896

(22) Filed: Feb. 22, 2022

(65) Prior Publication Data

US 2022/0182218 A1 Jun. 9, 2022

Related U.S. Application Data

(63) Continuation of application No. 16/615,425, filed as application No. PCT/EP2018/062830 on May 17, 2018, now Pat. No. 11,310,030.

(30) Foreign Application Priority Data

Jul. 31, 2017 (EP) .................................... 17184028

(51) Int. Cl.
*H04L 9/06* (2006.01)
*G06F 17/14* (2006.01)
*H04L 9/00* (2022.01)

(52) U.S. Cl.
CPC .......... *H04L 9/0631* (2013.01); *G06F 17/141* (2013.01); *H04L 9/002* (2013.01); *H04L 9/0618* (2013.01); *H04L 2209/16* (2013.01)

(58) Field of Classification Search
CPC ..... H04L 9/0631; H04L 9/002; H04L 9/0618; H04L 2209/16; G06F 17/141
See application file for complete search history.

(56) References Cited

U.S. PATENT DOCUMENTS

| 2004/0086117 A1* | 5/2004 | Petersen | ............... H04L 9/0668 380/44 |
| 2014/0040338 A1* | 2/2014 | Van Der Sluis | ........ G06F 7/588 708/254 |

(Continued)

FOREIGN PATENT DOCUMENTS

| WO | 2017063986 A1 | 4/2017 |
| WO | 2017080769 A1 | 5/2017 |

(Continued)

OTHER PUBLICATIONS

Attack and improvement of a secure S-box calculation based on the Fourier transform (Year: 2008).*

(Continued)

*Primary Examiner* — Vu V Tran

(57) ABSTRACT

Some embodiments are directed to an electronic cryptographic device arranged to perform a cryptographic operation on input data obtaining output data. The cryptographic device stores an internal state as sets of shares. Fourier coefficients corresponding to the sets of shares satisfy a predetermined relationship among them. The cryptographic operation is performed by repeatedly updating the internal state.

20 Claims, 9 Drawing Sheets

(56) References Cited

U.S. PATENT DOCUMENTS

2015/0301985 A1* 10/2015 Zhang .................. G06F 17/141
 708/403
2017/0149559 A1* 5/2017 Michiels ................ H04L 9/004

FOREIGN PATENT DOCUMENTS

WO 2018215487 A1 11/2018
WO 2018224382 A1 12/2018

OTHER PUBLICATIONS

Fast correlation attacks against stream ciphers and related open problems, A. Cacanteaut (Year: 2005).*

PCT/EP2018/062830 ISR & WO Jul. 17, 2018, 15 Page Document.
Bos et al: "Differential Computation Analysis: Hiding Your White-Box Designs is Not Enough"; IACR 2016, pp. 1-22.
Chow et al: "White-Box Cryptography and an AES Implementation"; SAC 2002, LNCS 2595, pp. 250-270, 2003.
Coron et al: "Attack and Improvement of a Secure S-Box Calculation Based on the Fourier Transform"; CHES 2008, LNCS 5154, pp. 1-14.
Prouff et al: "Provably Secure S-Box Implementation Based on Fourier Transform"; CHES 2006, CHES 2006, LNCS 4249, pp. 216-230.
Biryokov et al: "Structural Cryptanalysis of SASAS": Eurocrypt 2001, LNCS 2045, pp. 394-405.
Attack and Improvement of a Secure S-Box Calculation based on the fourier Transforms (2008).
Fast Correlation Attacks Against Stream Ciphers and Related Open Problems A. Cacanteaut (2005).

* cited by examiner

CRYPTOGRAPHIC DEVICE AND METHOD

CROSS-REFERENCE TO PRIOR APPLICATIONS

This application is a continuation of U.S. patent application Ser. No. 16/615,425 filed Nov. 21, 2019 which is the U.S. National Phase application under 35 U.S.C. § 371 of International Application No. PCT/EP2018/062830 filed on May 17, 2018, which claims the benefit of EP Patent Application No. EP 17184028.3, filed on Jul. 31, 2017. These applications are hereby incorporated by reference herein.

FIELD OF THE INVENTION

The invention relates to a cryptographic device, a cryptographic method and a computer readable medium.

BACKGROUND

A cryptographic primitive is called secure in the black-box model, if an attacker who only has knowledge of the inputs and outputs of the primitive cannot elevate his rights, e.g., obtain secret keys, encrypt messages, decrypt messages, etc. However, in practice attackers often do not operate in the black-box model, and in fact have more information than just the inputs and outputs. For example, in the grey-box model, it is assumed that an attacker has access to some information related to the execution of the primitive. These additional sources of information are called 'side-channels'. For example, side-channels include the amount of time that an operation took, or the amount of power that was consumed, etc. In an even stronger model, the so-called white-box model, and attacker has full access to all internal variables of the primitive. Attackers may also modify variables, even as the program is running. Even so, the white-box implementation aims to prevent the extraction of secret keys from the program.

Implementations that resist white-box attacks, are sometimes implemented as an encoded table network operating on encoded data. In the paper "White-Box Cryptography and an AES Implementation" by S. Chow, et al. a white-box implementation of the block cipher AES (Advanced Encryption Standard) is presented (referred to as 'Chow' below and incorporated by reference herein). Chow forms an implementation of AES that consists entirely of table look-up operations. Through several intermediate methods, the normal cipher is transformed to an implementation in this form, so that a table-network can be used to compute AES. By encoding the tables in the table-network, the system's resistance against analysis and attack is increased. The techniques used in Chow can be applied to other block ciphers as well.

Although a white-box implementation using a table-network is hard to analyze, a table based implementation of block cipher may still be vulnerable to some attacks. Interestingly, attacks developed in the context of the grey-box model can sometimes be effective against white-box implementations as well. Accordingly, avoiding attacks under the grey-box model can be an effective countermeasure in the white-box model too. An example of such attacks can be found in the paper "Differential Computation Analysis: Hiding your White-Box Designs is Not Enough.", by Joppe W. Bos, et al.

There is a need to better protect computer implementations of cryptographic primitives against attacks; in particular, a better protection against grey box type attacks applied to white-box implementations.

Reference is hereby made to the published PCT patent application WO 2017/063986 A1 ("A Cryptographic Device and an Encoding Device").

SUMMARY OF THE INVENTION

An improved cryptographic device is presented which addresses these and other concerns.

The cryptographic device is an electronic device. For example, the device may be a mobile electronic device, e.g., a mobile phone. The electronic device may be a set-top box, smart-card, computer, etc. The cryptographic device and/or the cryptographic method described herein may be applied in a wide range of practical applications. Such practical applications include: security, cryptography, content protection, copy protection, financial applications, privacy protection, communication applications, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a cryptographic device, FIG. 2 schematically shows an example of an embodiment of updating an internal state, FIG. 3a schematically shows an example of an embodiment of a representation of an internal state, FIG. 3b schematically shows an example of an embodiment of a representation of an internal state, FIG. 4a schematically shows an example of the sets of Fourier coefficients corresponding to an embodiment of a representation of an internal state, FIG. 4b schematically shows an example of the sets of Fourier coefficients corresponding to an embodiment of a representation of an internal state, FIG. 4c schematically shows an example of the sets of Fourier coefficients corresponding to an embodiment of a representation of an internal state, FIG. 4d schematically shows an example of the sets of Fourier coefficients corresponding to an embodiment of a representation of an internal state, FIG. 4e schematically shows an example of the sets of Fourier coefficients corresponding to an embodiment of a representation of an internal state, FIG. 5a schematically shows an example of an embodiment of a cryptographic method, FIG. 5b schematically shows an example of an embodiment of a cryptographic method, FIG. 6a schematically shows a computer readable medium having a writable part comprising a computer program according to an embodiment, FIG. 6b schematically shows a representation of a processor system according to an embodiment.

DETAILED DESCRIPTION OF PREFERRED EMBODIMENTS

Figure 1:
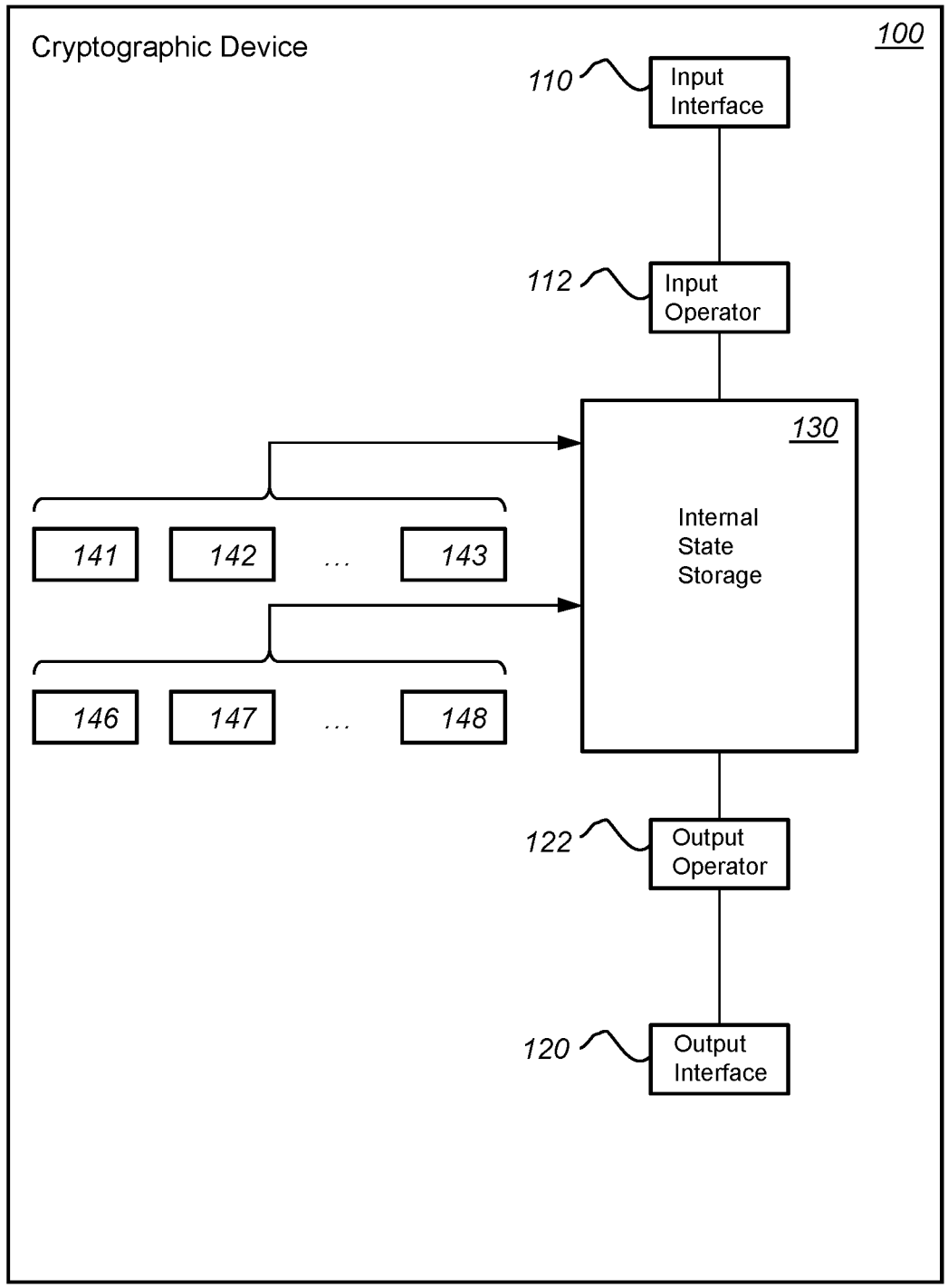

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Embodiments of the invention allow implementations of cryptographic primitives, such as block cipher, e.g., the AES algorithm that offer a high resilience against a large class of key-recovery attacks, including the white-box generalizations of known side channel attacks, as well as a number of pure white-box attacks. It is noted that implementations according to the invention have increased security not just in the white-box model, but also in the grey box model.

To introduce the invention first a number of attacks on white-box implementations are described. Throughout the document the focus is on the block cipher AES. AES is an important, much-used, cryptographic primitive. However, it is stressed that techniques below can be applied to other cryptographic primitives as well. For example, other block ciphers may be implemented as embodiments. Especially block ciphers of SLT design (Substitution/Linear transformation block ciphers, sometimes referred to as Substitution-permutation network (SPN) block ciphers), such as AES (Rijndael), 3-Way, Kuznyechik, PRESENT, SAFER, SHARK, and Square, can be adapted with little effort. The cryptographic primitive may be a symmetric primitive, e.g., wherein an encrypting/decrypting key is the same, or a signing/ verification key. The cryptographic primitive may also be key-less, such as a hash functions. Protecting hash functions may be important, as they may be applied to secret data. In fact, hash functions may be part of a keyed design, such as if the hash function is used in HMAC.

The Advanced Encryption Standard (AES) is described in Advanced Encryption Standard, Federal Information Processing Standards Publication 197, 2001. Below, we outline the major attacks that can be mounted against an implementation of AES, by a 'white-box' attacker who has access to the running program and its environment, and who is able to read and modify all program variables that appear in memory.

Apart from the memory scraping attack, which is a pure white-box attack, the major attacks originate from side channel analysis; these 'grey-box' attacks can also be applied in a white-box environment.

In a Memory scraping attack, the key is read from the program memory. This is the simplest white box attack. To thwart this attack, the key must never appear 'in the clear' in the program memory, but only in some encoded form.

Attacks based on Differential Power Analysis/Differential Computation Analysis/Mutual Information Analysis/Collisions, etc., all work on the principle of collisions. A collision occurs when an internal program variable takes on the same value for two different inputs or outputs of the program. When a collision occurs on a variable that depends not only on the program input or output, but also on the key, then the mere fact that a collision occurs, reveals information on the key. Note that, encoding all AES state and key bytes—e.g., choosing a set E of invertible mappings on the set $\{0,1,\ldots,255\}$ and replacing each state and key byte x by $E(x)$ for some $E \in E$—does not thwart a collision attack by itself: the encoding E obfuscates the value of byte x, but when a collision occurs on byte x, then it also occurs on the program variable $E(x)$.

In attacks based on Differential Fault Analysis, the attacker runs the program twice on the same input, introduces a fault by changing one or more program variables in one of the runs, and records both outputs. The way in which the two outputs differ may reveal information about the key.

A countermeasure to defend against the latter type of attacks is the masking of variables by using multiple shares to represent them. For example, a variable x can be additively represented by n shares $x_0,\ldots,x_{n-1}$, where $n \geq 2$ and $x_0 \oplus x_1 \oplus \ldots \oplus x_{n-1} = x$. Here addition is the XOR operation. For example, in hardware implementations, one may choose n−1 of the shares randomly and calculate the remaining one such that the n shares represent the variable x. Then a simultaneous collision on any set of k shares, where k<n, does not reveal any information about whether a collision occurs on variable x; only if a simultaneous collision occurs on all n shares, the attacker can infer that a collision occurs on x. An n-th order DPA attack is thus needed to extract the key.

In a white-box environment, the shares have to be encoded: if the attacker can simply sum (e.g., calculate the exclusive-OR of) the shares to recover the variable x or an encoding $E(x)$ of x, he can check whether there is a collision on the variable x represented by shares X by summing the shares. To prevent this attack, the values that appear in the program should be encodings $E_i(x_i)$ of the shares, where each share $x_i$ is encoded using a different encoding $E \in E$. Then the sum $\oplus_{i=0}^{n-1} E_i(x_i)$ is not related to x. Note that if the counter-measures described herein are applied to increase security only in the grey-box model, and not in the white-box model, separate encryption of each share may not be needed. This in turn may lead to more efficient implementations, e.g., by avoiding table look-up operations which operate on encoded shares.

It was an insight of the inventors that the latter, representing a variable as multiple encoded shares, can still be circumvented by a white-box attacker by introducing faults in two or more shares from the same set X, and checking whether the output of the program changes: if the output does not change, then the two share sets X* and X, with and without the faults, respectively, represent the same byte. In fact, when the shares $(\xi_0, \ldots, \xi_{n-1})$ with $\xi_i = E_i(x_i)$ represent the byte x, there exists a share set $(\xi, 0, 0, , , , , 0)$ in which the last n−1 shares have encoded value 0 and which represents the same value x. So in order to check whether two share sets X and X* represent the same value, the attacker changes X into for $(\xi, 0, \ldots, 0)$ for $0 \le \xi \le 256$ and checks for which value of $\xi$ the output is unchanged, he then finds such that $\xi^*$ and X* and $(\xi^*, 0, \ldots, 0)$ give the same output and he concludes that X and X* represent the same value if and only if $\xi = \xi^*$.

With the above attack added security of using shares is neutralized, and many of the grey-box type attacks, in particular attacks based on finding a collision, can be effectively executed. In an embodiment, this share reduction attack is avoided.

Embodiments make use of the discrete Fourier transform in the finite field. For example, in case data-elements are bytes the finite field may be $F_{256}$ the finite field with 256 elements. In an embodiment, the data-elements are binary words comprising multiple bits; in this case, a finite field with characteristic 2 is appropriate and size 2 to the power of the number of bits. This is not necessary though. One could construct a block cipher operating on words of, e.g., ternary bits, in which case the finite field may have characteristic 3, etc. Below computing with sets of shares is introduced and it is explained how they relate to the Fourier transform.

Representation of data-elements with shares are ideally suited to linear transforms. A linear transform has the property that $L(x_0 \oplus \ldots \oplus x_{n-1}) = \oplus_{i=0}^{n-1} L(x_i)$, so in order to apply L to variable x, L can be applied to each share individually. Note that the shares are typically encoded, so that the operation $L(x_i)$ and the summation may be performed by a table look-up. If the encodings of the shares are linear, the operator L can be represented on the shares as a matrix operating on the bits in the shares, e.g., on 'number of shares' times 'number of bits per data element' bits. Below more elaborate implementations of linear operators are discussed. For example, the shares may be encoded with linear encodings, e.g., random linear encodings so that the encodings can be integrated in the linear operation.

The above computation which works for linear operators does not work for non-linear operators, in particular substitutions boxes, such as the S-box of AES. Interestingly, any non-linear operation on a data element may be represented as a polynomial. For example, a non-linear transformation f on bytes is a polynomial on the finite field $F_{256}$.

$$f : x \mapsto \sum_{j=0}^{255} f_j \cdot x^j, \text{ with } f_j \in F_{256}.$$

Here the sum ($\Sigma$) is the addition on $F_{256}$, e.g., the exclusive-OR of the bytes, and stands for the multiplication on $F_{256}$. Non-linear transformations can be applied to shares by means of convolutions. The convolution of two share sets $X = (x_0, \ldots, x_{n-1})$ and $Y = (y_0, \ldots, y_{n-1})$ is defined as $$Z = X * Y, \text{ where } Z = (z_0, \ldots, z_{n-1}) \text{ with } z_i = \bigoplus_{j=0}^{n-1} x_j \cdot y_{i-j \bmod n}.$$

It holds that $z = \oplus_{i=0}^{n-1} z_i = x \cdot y$: the convolution of the shares is a share representation of the product. It follows that the function f can be implemented on shares as the function $X \mapsto \Sigma_{j=0}^{255} F_j * X^j$, where $X^j$ is the j-fold convolution of X with itself: $X^0$ is a share representation of 1, $X^1 = X$, $X^2 = X*X$, $X^3 = X*X*X$, etc., and where $F_j$ is a share representation of $f_j$.

The AES S-box can be written as $S = \oplus_{S(0)} \circ M \circ I$, where $I(x) = x^{254}$ is the inverse on $F_{256}$, M is an additive operator on $F_{256}$ and the operation $\oplus_{S(0)}$ dds $S(0) = 0 \times 63$ to its input on $F_{256}$. The additive operator M can be written as an additive polynomial $$M(x) = \sum_{j=0}^{7} m_j x^{2^j},$$

with $m_0 = 0x05$, $m_1 = 0x09$, $m_2 = 0xf9$, $m_4 = 0x25$, $m_5 = 0x01$, $m_6 = 0xb5$, $m_7 = 0x8f$.

Below we further discuss the discrete Fourier transform when the number of shares (n) divides the number of elements in the finite field minus 1; e.g. in the case of bytes, n divides 255. Below we discuss the case for bytes, but for other fields the situation is analogous. For an element $x \in F_{256} \setminus \{0\}$, the order of x, denoted ord(x), is defined as the smallest positive number k such that $x^k = 1$. For all x, ord(x) divides 255. the number of elements of $F_{256} \setminus \{0\}$. Let n be a divisor of 255, e.g., $n \in \{1,3,5,15,17,51,85,255\}$, and let $\Omega$ be an element of order n. The Fourier transform $\hat{X} = (\hat{x}_0, \ldots, \hat{x}_{n-1})$ of $X = (x_0, \ldots, x_{n-1}) \in F_{256}^n$ is defined as $$\hat{x}_k = \sum_{j=0}^{n-1} \Omega^{jk} x_j, 0 \le k < n.$$

We call the numbers $\hat{x}_0, \ldots, \hat{x}_{n-1}$ the Fourier coefficients of the share set X. The inverse Fourier transform is given by $$x_j = \sum_{k=0}^{n-1} \Omega^{-jk} \hat{x}_k, 0 \le j < n.$$

Compared to the conventional Fourier transform on $C^n$, the overall factor 1/n is missing since $F_{256}$ has characteristic 2 and n is odd. Note that, even though any permutation of a set of shares represents the same data element, for the purpose of the Fourier transform we regard the set as ordered. Likewise, a set of Fourier transforms is ordered. Note that it is unlikely that a permutation of a set of Fourier coefficients still represents the same data element. If a particular Fourier coefficient in a set of Fourier coefficients needs to be identified we refer to its index, e.g., its subscript.

The inventors had the insight that a white-box device could hide cryptographic data in Fourier coefficients. The device would still act on a set of shares, or on multiple sets of shares, but the relevant data would be coded in the set or sets of Fourier coefficients that correspond to the set of shares. This has several consequences. The sets of Fourier coefficients are themselves not directly stored in the device. The Fourier coefficients only become available by computing them from a set of shares. However, since the Fourier transform is linear, the Fourier transform can be hidden efficiently by combining it with the affine operations in the cryptographic algorithm and the encoding of the shares. For example, one could combine: a decoding operation, a Fourier transform, one or more linear operations, an inverse Fourier transform, and an encoding operation, all into one combined linear operation. Furthermore, both affine and non-linear operations can be effectively computed on the Fourier coefficients. As pointed out, the affine operations combine naturally with the linear Fourier transform. Non-linear operations, in particular parallel application of substitution boxes, e.g., in a so-called s-box layer, can be computed by representing the s-box as a polynomial. Using convolutions, polynomials can be effectively computed on Fourier coefficients. In an embodiment, the data size of the Fourier coefficients, e.g., of the elements of set of shares as well as of the set of Fourier coefficients, is equal or larger than the input and output size of the substitution boxes in an s-box layer.

Some conventional encodings, e.g., used in masking, have the problem that the masking is compatible with some operations, but not with others. The non-compatible operations then require vulnerable or costly solutions. However, using the Fourier coefficients all required operations can be efficiently performed.

Using Fourier coefficients may be used to improve resistance against attacks in other ways as well. If an attacker modifies a single data element of a set of shares, e.g., to try to execute a fault attack, multiple of the corresponding Fourier coefficients will be changed. This can be exploited in different ways. For example, one may encode multiple cryptographic data elements in the same set of Fourier coefficients. An attacker who modifies a single data element of the set of shares may thus modify more than one of the cryptographic data elements stored in the set of Fourier coefficients. For fault attacks, an attacker typically desires to change only a single one of the cryptographic data elements, not multiple ones. For example, one can prove mathematically that to modify a single Fourier coefficient, in a set of 17 Fourier coefficients, one needs to modify at least 9 shares of the corresponding set of shares.

Another way to use Fourier coefficients to improve security is to impose restrictions on the Fourier coefficients that are not needed for representing cryptographic data. This can be done within a single set of shares, e.g., by requiring that some of the Fourier coefficients which are used for fault detections satisfy some invariant, e.g., that they have a specific value. This can also be done across multiple sets of shares, e.g., by requiring that some of the Fourier coefficients corresponding to a first set of shares and some of the Fourier coefficients corresponding to a second set together satisfy some invariant; for example, that a Fourier coefficient in a first set is equal to a Fourier coefficient in a second set. The latter helps against share reduction attacks as well.

In an embodiment, a set of Fourier coefficients comprises both representing and non-representing data elements, or error-detecting data elements. Together all sets of Fourier coefficients represent all data elements of the internal state. Error detecting elements are also referred to as protective elements. For example, each one of the sets of Fourier coefficients may have both types. The representing data elements in a set of Fourier coefficients represent one or more cryptographic data elements, e.g., data elements of an internal state. For example, the representing data elements may be equal to the data elements that they represent. For example, the representing data elements may be represented in some other way, for example, there may be an encoding that maps the representing data elements to their counterparts. In particular, there may be an affine mapping from the representing data elements to the elements that they represent, the latter may be the same in number or fewer.

A proper subset of the Fourier coefficients (that is, a subset of the Fourier coefficients that is not equal to the full set of Fourier coefficients, i.e., a strict subset) determines the one or more data elements represented by that set of shares. In other words, from a set of the Fourier coefficients one could uniquely determine the one or more data elements—in fact the proper subset would already suffice. Generally speaking, it may not be possible to uniquely determine the (full) set of the Fourier coefficients from the one or more data elements; in an embodiment, there are multiple sets of the Fourier coefficients and thus multiple sets of shares that all validly represent the same one or more data elements.

The error-detecting data elements are arranged to detect unauthorized changes during the execution of the program, e.g., tampering. For example, the error-detecting data elements comprise redundant data arranged to detect tampering. In an embodiment, the error-detecting data elements may satisfy some predetermined relationship among them. The predetermined relationship may extend across sets of Fourier coefficients (if there are multiple). For example, the predetermined relationship may be a linear relationship that is satisfied by the error-detecting data elements, e.g., that some or all data elements are equal or that some linear sum of error-detecting data elements is equal to some other linear sum of error-detecting data elements, etc. For example, the predetermined relationship may be an affine relationship that is satisfied by the error-detecting data elements, e.g., that some or all data elements are equal to a particular value. The linear or affine operation may include the representing elements, for example, the relationship may require that an affine operation applied to the representing elements and error-detecting elements is the all zero-vector. For example, the latter operation may express that an error-detecting element has a fixed value and/or that an error-detecting element is equal to a representing element. The operations may be configured so that they do not provide useful output anymore, e.g., distorted output, e.g., randomized output, if they receive an input which does not satisfy the expected relationship. In an embodiment, a set of Fourier coefficients, or even all sets of Fourier coefficients comprise both representing elements and protective elements. Some elements in a set of Fourier coefficients may be neither representing nor error-detecting. They may simply be ignored and filled with dummy values.

In an embodiment, a subset of the Fourier coefficients, e.g., of the error-detection elements, are equal to a predetermined value. One may regard this set as a vector with a particular value. The affine operation may be configured to map this subset, e.g., this vector to further vector with a particular value. Likewise, the non-linear operation may also map such a vector from one particular value to another. The vector formed by the error-detection element(s) with a particular value may thus be mapped from round to round having a particular value in each round. The value taken by this vector may be different after each operation, and can be chosen at compile time, e.g., randomly.

Below various embodiments are disclosed of white-box devices using Fourier coefficients to hide data relevant for the execution of the cryptographic algorithm. In a first series of embodiments, the data elements of an internal state of a cryptographic algorithm are each encoded with their own set of shares. So, one may for example have as many sets of shares as there are data elements in the internal state. For example, in the case of AES with an internal state of 16 bytes, and sets of shares of 17 bytes, one may encode the internal states as 16 times 17 bytes. Each set of Fourier coefficients corresponding to a set of shares encodes a single byte of the internal state. In such embodiments, there are many non-representing, e.g., error-detecting, data elements, e.g., 16 bytes for each set of Fourier coefficients. On the error-detecting bytes an invariant may be maintained. As a result, strong detection of unauthorized modifications by attackers is possible as such a modification would likely not preserve the invariant.

It is not necessary to represent only a single data element in a set of Fourier coefficients. One may represent multiple data elements in the same set. For example, further below embodiments are disclosed in which the entire internal state of a cryptographic algorithm is encoded in a single set of Fourier coefficients. Such embodiments have the advantage that overall fewer sets of shares are needed to encode the full internal state, and thus that the encoding of the internal state requires less data. This in turn leads to fewer or smaller tables, and reduced storage requirements. Embodiments may have fewer non-representing data elements in their sets of Fourier coefficients. This will not necessarily lead to a weaker implementation though. Although fewer error-detecting data elements may imply weaker error-detection capabilities, having more data elements, or even an entire internal state represented in a single set of Fourier coefficients increases the likelihood that modifying single element of a set of shares leads to modifying multiple data elements of the internal state, rather than a single data element as is desired in a fault attack. Furthermore, an increase in the number of representing data elements in the Fourier coefficients can be compensated by choosing a larger set. The latter need not lead to an increase of the size of an encoded internal state since fewer sets of shares are needed. For example, a set of shares of size 17 or 51 could each encode a full internal state.

A first example of hiding a data element in a Fourier coefficient can be obtained, when the share representation is used, with the convention that the sum of the shares equals the represented data element, there is an interesting connection with the Fourier transform: The value represented by the share set X is equal to the zeroth Fourier coefficient $\hat{x}_0$, so the result above implies that if $Z=X*Y$, then $\hat{z}_0 = \hat{x}_0 \cdot \hat{y}_0$. In fact, this relation holds for all Fourier coefficients, not just the zeroth:

$$Z = X*Y \Leftrightarrow \hat{z}_k = \hat{x}_k \cdot \hat{y}_k, 0 \leq k < n.$$

This implies that the mapping $X \mapsto \Sigma_{j=0}^{255} F_j * X^j$, effectively maps Fourier coefficient $\hat{x}_k$ onto $\Sigma_{j=0}^{255} (\hat{f}_j)_k (\hat{x}_k)^j$, where $(\hat{f}_j)_k$ is the k-th Fourier coefficient of the share set $F_j$. In embodiments, this natural mapping between a set of shares representation and the corresponding set of Fourier coefficients is exploited, by using the Fourier coefficient with index 0 to represent the data element and Fourier coefficients with a higher index to protect against attacks. However, this is not at all necessary: any one, e.g., any single one or two or more together, of the Fourier coefficients may represent the data element, with the remaining Fourier coefficients used to protect against attacks. For example, in an embodiment the data value is not determined solely by the zeroth Fourier coefficient, but by one or more different Fourier coefficients, or by the zeroth Fourier coefficient together with one or more different Fourier coefficients.

The inventors realized that the share reduction attack is successful if it is possible to change two or more shares from a share set in such a way that both the value that the share set represents, and the program output remain the same. The fact that the output doesn't change is used by the attacker as a signal that the faults that he injected did not change the value represented by the share set. One way to thwart this attack, is a mechanism to change the output, preferably in a manner that is unpredictable to an attacker, whenever a change is made to a set of shares X, even when that change leaves the value represented by the share set (e.g., the value $\hat{x}_0$) the same. The protective elements in the sets of Fourier coefficients can be used to detect if a change was made to a set of shares.

An embodiment, using a single representing element for each set of Fourier coefficients may be described in summary as follows. Suppose we have n shares $x=x_0, \ldots, x_{n-1}$ representing a secret x over some finite field $\mathbb{F}_q$ of order q. Let $\alpha \in \mathbb{F}_q$ be a primitive n-th root, e.g., $n \in \mathbb{Z}_q$ is the smallest power such that $\alpha^n=1$. Recall that n should divide q−1. The Fourier Transform of x is defined as $\hat{x}$, where $$\hat{x}_i = \Sigma_{j=0}^{n-1} \alpha^{i*j} x_j.$$

We call $\hat{x}_i$ the i-th Fourier Coefficient of x.

A closer look at block ciphers of the AES type shows that it is constructed as follows:

$$AES = A_m \circ S \circ A_{m-1} \circ S \circ A_{m-2} \circ S \circ \ldots \circ S \circ A_0$$

where $A_i$ are round-dependent affine transformations and S the SubBytes layer. In the FIPS 197 definition of the S-box layer (Section 5.1.1), the S-box includes both a non-linear part (the inverse) and an affine part. The latter may be incorporated in the affine operation $A_i$ neighboring an s-box. Here $A_0$ represents the input transformation followed by adding the first round (dummy) key, and $A_m$ denotes adding the last round key, followed by the linear output transformation.

Let $X=x^0, \ldots, x^{15}$ denote the shared AES state before $A_i$. In this embodiment, the choice was made for n=17 shares. So x denotes a vector of size 16*17=272 bytes. The remaining transformations $A_i$ may be constructed as follows:
1. Decode (using matrix $D_i$)
2. Fourier Transform (using matrix F)
3. Permute, actually putting the 17 Fourier coefficients next to each other (using matrix T), e.g.:

$$\widehat{x^0}_0, \widehat{x^1}_0, \ldots, \widehat{x^{15}}_0, \widehat{x^0}_1, \widehat{x^1}_1, \ldots, \widehat{x^{15}}_{16}.$$

4. Perform round-dependent linear operation (using matrix $L_i$)
5. Permute back (using matrix $T^{-1}$)
6. Invert Fourier Transform (using matrix $F^{-1}$)
7. Encode (using matrix $E_{i+1}$)
8. Add vector (using vector $V_i$)

In an embodiment, steps 1-7 are linear operations that are implemented by matrix multiplications. Thus, given that the encodings are linear, these steps can be implemented by a single matrix multiplication using matrix $$L'_i = E_{i+1} F^{-1} T^{-1} L_i TFD_i.$$

And the operation $A_i$ is defined as $$A_i(X) = V_i + L'_i(X).$$

The vector $V_i$ corresponds to the sum of the key and the addition part of the S-box layer. This embodiment provides a non-trivial action on the representing as well as on the non-representing elements. Suppose for the moment that $L_i$ is composed as follows: let M denote the linear 16×16 bytes matrix representing the ShiftRows and MixColumns operation. Next let $L_i$ be the block diagonal matrix consisting of 17 copies of M in the diagonal:

$$\begin{pmatrix} M & & 0 \\ & \ddots & \\ 0 & & M \end{pmatrix}.$$

It follows that $L_i$ actually computes 17 ShiftRows and Mixcolumns in parallel on $\widehat{x^0}_j, \widehat{x^1}_j, \ldots, \widehat{x^{15}}_j$ for $0 \le j \le 16$.

Next consider the operation S. The property that each convolution implies a point-wise multiplication on the Fourier Coefficient means that if the squaring is also implemented as a convolution, the inversion operation in S inverts all Fourier Coefficients in parallel. Thus, if the linear part of S and the addition of the constants are chosen to have the same effect on all Fourier Coefficients, it follows that S computes the SubBytes function of all Fourier Coefficients.

Performing non-trivial operations, in this case AES or AES like operations on the non-representing coefficients is considered an advantage, as it will make it harder for an attacker to find where the real AES is taking place. In fact, this embodiment shows that parallel evaluation of 17 AES evaluations is possible. Note that this observation holds for any algorithm that can be represented as an . . . SASASASASA . . . structure.

Furthermore, a convolution computes simultaneously the point-wise product of all the Fourier Coefficients, as opposed to the linear transformation, where one has the freedom to specify what happens which each separate Fourier Coefficient. Each linear operation can be hidden in this matrix. In fact, any two non-linear functions can be written as polynomials and can be evaluated in parallel in different Fourier Coefficients. Indeed, using a convolution network all relevant powers of the inputs can be computed in parallel, while the inner-product with the polynomial coefficients (the only difference between the polynomials) is linear and, hence, can be computed in parallel by a matrix product.

FIG. 1 schematically shows an example of an embodiment of a cryptographic device 100. Device 100 is arranged to perform a cryptographic operation on input data and obtain output data; the output data is the result of applying the cryptographic operation to the input data. In an embodiment, the input data and output data are both plain data. We refer to plain data as data which is not encoded with a secret encoding, e.g., an encoding which is unknown to an attack, e.g., a private encoding, e.g., private to device 100. The cryptographic operation may be an encryption or decryption operation, e.g., symmetric, e.g., a block cipher, e.g., AES, or a signing or verification operation, e.g., symmetric. The latter may be a MAC constructed from a hash function or from a block cipher, e.g., a block cipher running in CBC-MAC mode. Device 100 may be integrated in a device that uses the cryptographic operation for some purpose. For example, device 100 may be arranged to receive encrypted content. Using the cryptographic operation, the content may be decrypted. Because of the nature of a white-box implementation, even if the content is decrypted, it is still hard to obtain the key with which the content is decrypted. For example, device 100 may be arranged to authenticate financial transaction, e.g., by applying a signature or a MAC to a message. For an attacker, it is hard to extract the key with which the operation was done from the device, e.g., from software running on the device.

The execution of the primitive is implemented in a processor circuit, examples of which are shown below. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may be wholly or partially be implemented in computer instructions that are stored at device 100 and are executable by a microprocessor of device 100. In hybrid embodiments, functional units are implemented partially in hardware, e.g., as coprocessors, e.g., crypto coprocessors, and partially in software stored and executed on device 100.

Device 100 comprises an internal state storage 130. The internal state storage 130 may be implemented as a memory, e.g., an electronic memory. The internal state storage 130 is arranged to store a representation of an internal state. The internal state comprises one or more data elements. Data elements may be binary data elements. For example, the data element may be bytes, nibbles or larger words, e.g., in an embodiment, data elements comprise multiple bits, say at least 4 bits, and have at least 16 different possible values. Typically, all data elements have the same size. The internal state is repeatedly updated. For example, in the case of AES a plain internal state comprises 16 data elements, in this case 16 bytes, for a total of 128 bits. A set of shares representing the internal state may also use bytes for data elements, but will typically have a larger size, e.g., use more than 16 bytes. The data elements of an internal state are not directly stored in internal state storage 130, as is further explained herein.

Figure 2:
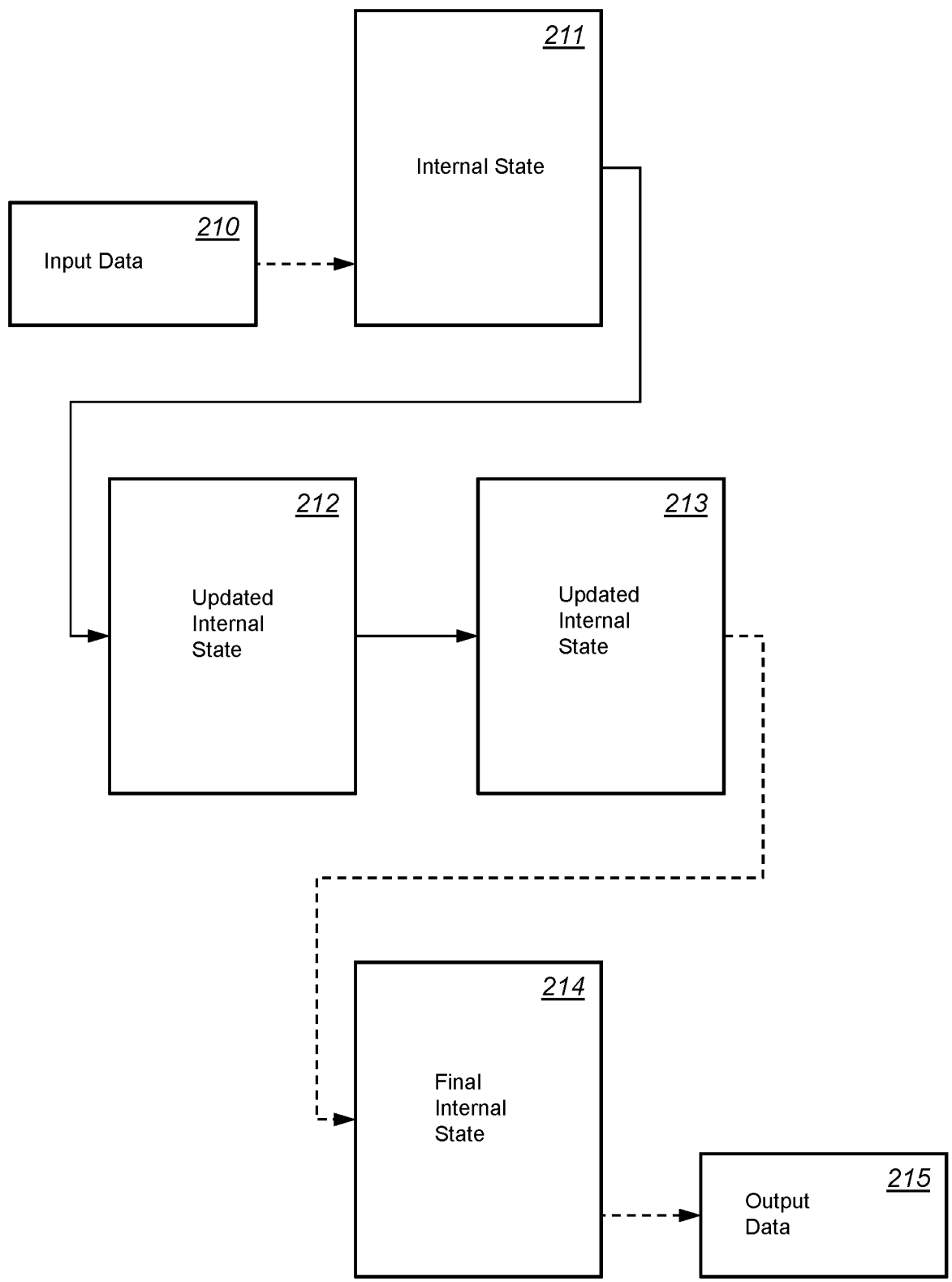

This is illustrated in FIG. 2. FIG. 2 schematically shows an example of an embodiment of updating an internal state. Shown in FIG. 2 are internal states 211, 212, 213, 214. By applying linear or non-linear operators the internal states are updated. Shown in FIG. 2 is the update from internal state 211 to internal state 212, from internal state 212 to internal state 213. An initial internal state is derived from the input data. In FIG. 2 the input data is represented at 210, and the initial internal state is internal state 211. Likewise, output data 215 is derived from a final internal state 214. Some of the operations on an internal state may be key dependent. Often the input and output data 210, 215 will be plain, e.g., not encoded with a secret encoding. If device 100 is configured for a block cipher encryption the plain output data is nevertheless an encryption of the input data, e.g., plain encrypted data. This is not necessary though. Device 100 may be integrated in a larger cryptographic system, e.g., a Digital Rights Management (DRM) system. In such a system content can only be rendered if it is allowed by a digital right. The data that enters the cryptographic primitive may be data which is the result of or an input to further cryptographic processing or decision taking. These operations may be performed on encoded data as well. In such a case one or both of the input and output data may be encoded and not plain. It will further be assumed the input and output data is unencoded but an embodiment with encoded input/output data may be produced by leaving out the corresponding transformation steps, e.g., encoding and decoding operations.

Figure 3A:
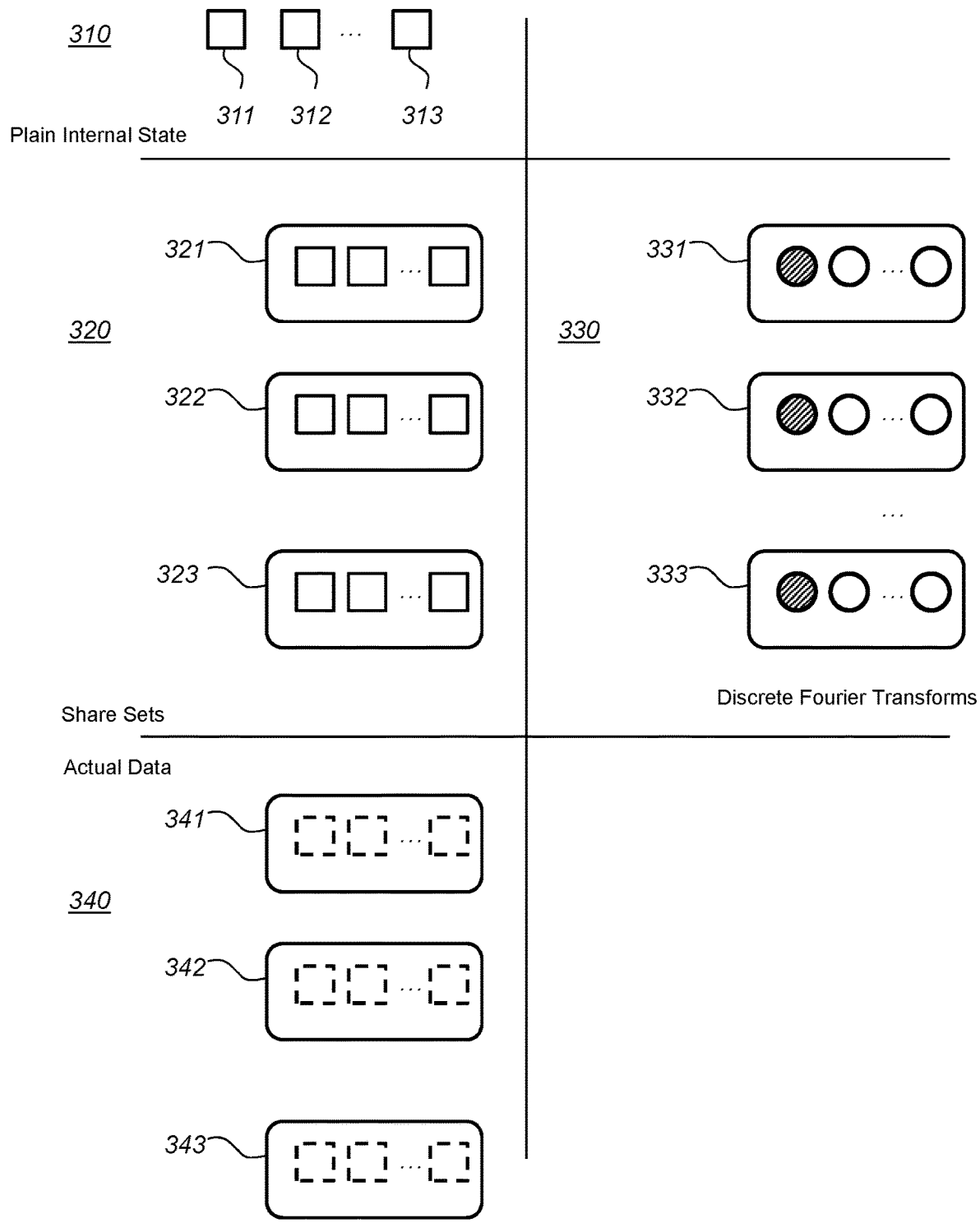

The internal states are represented in internal state storage 130 in a special manner. FIG. 3a schematically shows an example of an embodiment of a representation of an internal state. FIG. 3a shows a table with different views of the same internal state. Only the lower left box, at 340 shows the actual data as it is physically stored in internal state storage 130, e.g., in a memory. The individual data elements in box 340, e.g., bytes, are dashed to indicate that they are encoded. For example, they may be encoded with some secret, e.g., random encoding chosen at compile time. The right column is the Fourier transform of the left column.

Shown in box 310 is a plain internal state. Shown are data elements, e.g., bytes, 311, 312 and 313 of the internal state. For example, in case of AES the number of bytes may be 16 or more. For example, the internal state 310 may be the 'state array' as defined in FIPS 197.

Each data element shown in box 310 may be represented in the memory as a corresponding set of shares. For example, data element 311 corresponds to share set 321, data element 312 corresponds to share set 322 and data element 313 corresponds to share set 323. The relationship between a data element and a share set is one to many. The data size of a share set is a multiple of the size of a data element. For example, a share set may comprise multiple shares, each of which have the same size as the data elements, e.g., they may both be bytes.

The share sets shown in box 320 are not encoded. Thus, if these shares set were used like this in a white-box implementation, an attacker could simply read the shares from memory and map them to the correct data element.

In box 330, discrete Fourier transforms of the share sets in 320 are shown. Shown are sets of Fourier coefficients 331, 332 and 333. For example, set of Fourier coefficients 331 may be obtained by applying a discrete Fourier transform in a finite field to share set 321. The sets of Fourier coefficients in box 330 are not encoded either, and cannot be stored in a memory in this way either in a white-box implementation. Box 340 shows the internal state represented as sets of encoded shares. The data in box 340 may be obtained from box 320 by encoding each share in each set separately. For example, by encoding the first share in set 321 one may obtain the first share in set 341, etc. In an embodiment, only the data shown in box 340 may be directly visible, e.g., may be physically stored in the memory.

Interestingly, encoding is done in the shares domain, whereas the meaning of a share set is expressed in the Fourier domain. Shares are separately encoded which normally obstructs performing most operations on them. However, the Fourier coefficients are a global property determined by the entire share set; through the relationship between the Fourier transform and convolution the meaning of the share sets can be manipulated even though they are separately encoded.

A set of shares in box 320 or 340 represents a data element of the internal state. Which data element is represented, depends on the Fourier coefficients. In the embodiment shown in FIG. 3a, one of the Fourier coefficients for each of the set of Fourier coefficients in box 330 is chosen as the data element it represents. The representing Fourier coefficient has been indicated by diagonal hatching. Non-representing Fourier coefficients are indicated as clear. In this example, there is exactly one representing Fourier coefficient for each set of Fourier coefficients. For example, the representing coefficients in sets 330 may be equal to the data elements in internal state 310.

Figure 3B:
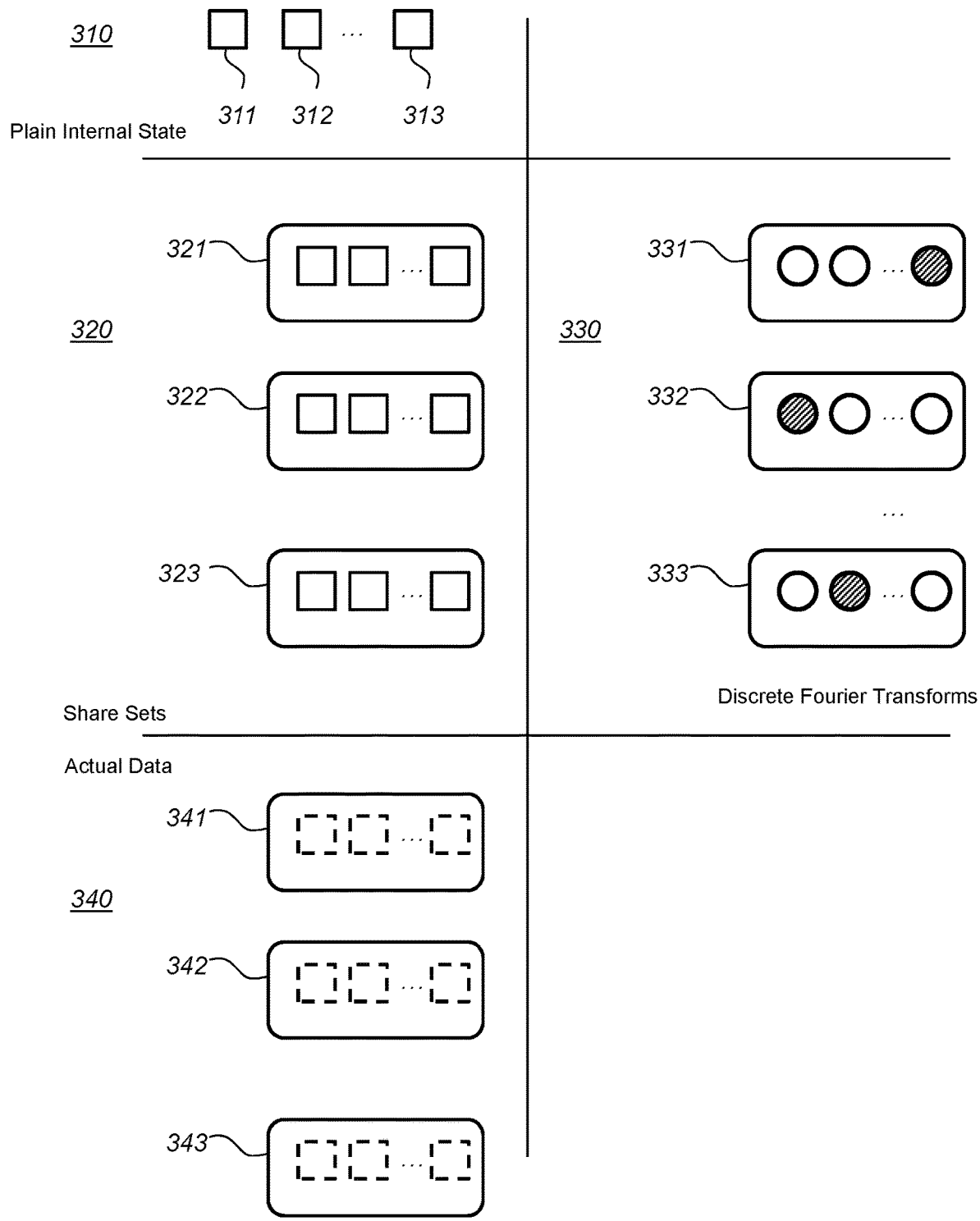

For example, one may choose a predetermined one of the Fourier coefficients corresponding to the set of shares which gives the value of the data element, e.g., the Fourier coefficient may be equal to the data element. In this case, it is the zeroth Fourier coefficients (e.g. the Fourier coefficient with index 0) which determines the value of the corresponding data element. This choice simplifies analysis and implementation as it has the consequence that the sum of the corresponding set of shares also determines the data elements (e.g. equals it). However, this is not needed. In an embodiment, some other Fourier coefficient may determine the data element, e.g., the coefficients of index 1. It is not even needed that the same coefficient represents the data element for the different sets, e.g., in set 331 it may be the Fourier coefficient of index 0, while in set 332 it is the Fourier coefficient of index 1, etc. FIG. 3b shows an example, in which one of the Fourier coefficients has been randomly chosen at compile time as the representing coefficient. In fact, which Fourier coefficient represents the data value may even vary per round, e.g., per update of the internal state. For example, after the next update, in set 331 it may be the Fourier coefficient of index 2, while in set 332 it is the Fourier coefficient of index 3, etc. For example, the Fourier coefficients may be permuted in an affine part of the round function, but not during a non-linear part of the round function.

Even more generally, it is not needed that a single Fourier coefficient determines the data element. For example, in an embodiment a subset of the Fourier coefficients determines the data element, e.g., a subset with 2 or more elements. The subset is a proper subset, e.g., at most half of the Fourier coefficients determine the data values. The remaining Fourier coefficients are used to protect against attacks, such as the share reduction attack.

Figure 4A:
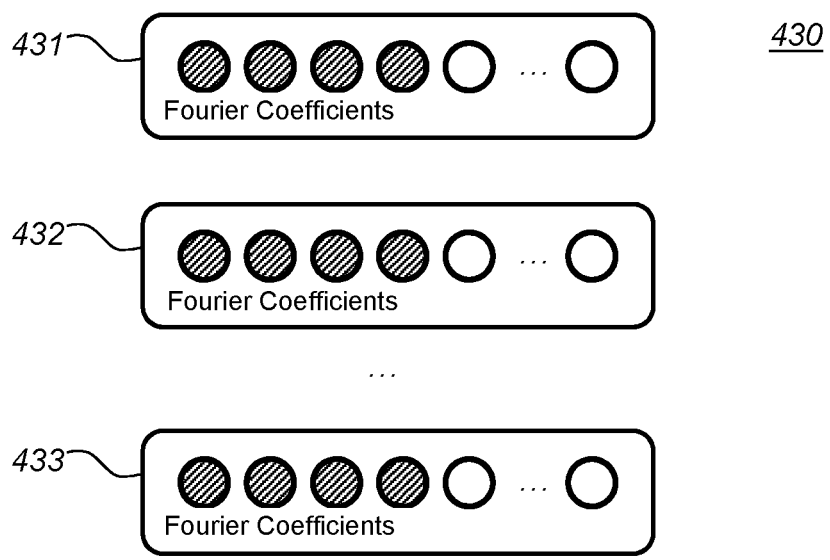
Figure 4B:

Some embodiments in which sets of Fourier coefficients have multiple representing elements are illustrated with respect to FIGS. 4a-4b. In these figures only the set or sets of Fourier coefficients are shown and not the corresponding set of shares. In other words, what is shown in these figures corresponds to box 330 in FIGS. 3a and 3b. As in FIGS. 3a and 3b, the box 430 shown in these figures would itself not be present in an implementation. Instead, encoded sets of shares are present in the implementation for which the Fourier transform of the decoding corresponds to boxes 430. The same holds for FIGS. 4c-4e

FIG. 4a shows multiple sets of Fourier coefficients in which each set comprises four representing elements, in this case the first four elements, e.g., indices 0, 1, 2, and 3. The number or positions of the representing elements may change. For example, each representing elements may be equal to an element of the internal state.

The number of representing elements need not be the same for each set. For example, in an embodiment with an internal state of 16 bytes and a Fourier transformation over the convenient binary field with 256 elements, one may take four sets of Fourier coefficients each having 17 bytes, four of each representing the 16 bytes of the internal state. The remaining $4*17-4*4=52$ bytes may be used as non-representing bytes, e.g., as error-detecting bytes. For example, some predetermined property may be enforced on the non-representing bytes in case of normal, e.g., untampered, execution. Corresponding to the 4 sets of 17 elements, one might have 4 sets of 17 shares, e.g., also bytes. The sets of shares related to the sets shown in FIG. 4a are related to through a Fourier transform. An encoding of the sets of shares, e.g., component wise encoding, is stored in the memory. An advantage of this example, is that it uses much fewer bytes to represent an internal state of the same size using share sets of the same size according to FIG. 3a, i.e., $4*17$ instead of $16*17$ bytes. Furthermore, the embodiment of FIG. 4a has the advantage that a small modification made the share sets corresponding to FIG. 4a are likely to modify multiple data elements at the same time, thus complicating fault attacks.

Other examples of encoding an internal state of 16 bytes include two sets of Fourier coefficients each having 8 representing bytes, and three sets of Fourier coefficients having 5, 5 and 6 representing bytes. The non-linear operation may be performed on the representing elements by applying a convolution network to all individual shares, while the affine operations may be done by an affine operation which takes all sets of shares as input.

FIG. 4b illustrates a further embodiment. In this case the entire internal state is represented in a single set of Fourier coefficients. For example, in case of an internal state of 16 bytes, one may use a set of Fourier coefficients with, say 17 or 51 elements, which in turn would give 17−16=1 or 51−16=35 non-representing elements.

These examples of encoding an internal state may be varied as required by the cryptographic primitive that is implemented. For example, an internal state of more or fewer bytes could be represented by using more or fewer representing coefficients. For example, in the examples above one may turn a representing coefficient to a non-representing one or vice versa to accommodate a decrease or increase of the size of the internal state. In embodiments, the size of the sets of shares is equal to the size of the set of Fourier coefficients, this being a result of the application of the discrete Fourier coefficient. However, in an embodiment one may hide this by adding dummy elements to sets. Furthermore, in embodiments the size of sets of Fourier coefficients is chosen as a divisor of the size of the field minus one. For example, for bytes suitable choices are divisors of 255 such as 15, 17, 51, or 85. One may require sets to be as large as the internal state itself. This is not required, but may give additional security advantages, since the entropy in the input is then fully preserved in the sets. This would give set of shares of size 17, 51, 85 or 255. At the cost of adding complexity to implement the underlying arithmetic one could use other fields to obtain other sizes for the set, e.g., using ternary logic, one may use the field with 243 elements, which in turn allows one to work with sets of 11 or 121 elements, etc.

In these examples, each set of Fourier coefficients comprises some element which is not required to represent an element of the internal state. Such elements may be used to detect tampering with the regular execution. For example, consider an operation which receives as input one or more sets of shares for which some or all of the non-representing elements satisfy some expected property. The correct execution of the operation may be dependent upon that property being present. If tampering modifies the property then correct execution is impaired, resulting in results which are not according to the expectations of an attacker. This in turn will frustrate his attempts, e.g., of fault attacks or of finding a collision, etc.

In an embodiment, a set of Fourier coefficients corresponding to a set of shares comprises both one or more representing elements and one or more error-detecting elements, wherein the representing elements determine one or more data elements of the internal state, and wherein the one or more error-detecting elements comprise redundant data arranged to detect tampering of the set of shares. For example, during the updating the values of the representing elements in the updated internal state may depend on the representing elements for the previous internal state. In addition, the values of the representing elements may depend upon the error-detecting elements, e.g., by including, e.g., adding a distortion which is zero in case the error-detecting elements do not detect an error. The distortion may be done in operations in intermediate rounds, e.g., not at specific or final rounds, e.g., if the redundant information can be verified locally. This is the case for such relationships as two coefficients being equal or having a specific value and the like. This may also be done at the output operator or only at some specific later round in case the relationship is global, examples of which are given below.

In an embodiment, the sets of Fourier coefficients corresponding to the sets of shares in the memory satisfy a predetermined relationship among them. This predetermined relationship is preserved by the updating, e.g., as an invariant. The basic idea is to partly use the freedom available in the selection of shares that represent a variable for enforcing relations between the sets of shares representing different variables. The relationship is expressed in terms of the Fourier transform in the finite field $F_{256}$. For example, in an embodiment, the predetermined relationship comprises that some of the Fourier coefficients are equal.

It has an advantage if the relationship, in particular an equality relationship, is between coefficients in different sets. This has the advantage that the number of valid sets of shares for a single share set is not reduced. This could happen in particular, if a set of shares is relatively small and/or contains relatively few representing elements. If the number of valid sets of shares is reduced too much, a risk of collision attacks is introduced. Introducing redundancy in the encoding of an internal state by requiring that Fourier coefficients of different sets of Fourier coefficients are equal does not reduce the number of valid set of shares and thus does not increase the risk of a collision in a single set of shares. On the other hand, if a set of Fourier coefficients contains many representing elements this risk is smaller. In particular if it contains a full copy of the internal state, there is no risk of a collision anyway, and thus one may more freely choose the relationship. How large an acceptable risk of collision is allowed, depends on the application. How large of a risk is still acceptable depends on such factors as the economic value of the protected key or the expected resources of an attacker. For Grey-box instead of White-box implementations more risks could also be taken. Below various examples of relationships are given.

For example, in an embodiment the relationship comprises that two or more Fourier coefficients of different sets of Fourier coefficients are equal. For example, particular Fourier coefficients may be selected, e.g., at compile time. For example, in an embodiment the sets of Fourier coefficients are ordered, coefficients in the set having an index. The predetermined relationship comprises that for at least some index, at least two of the Fourier coefficients of the same index are equal. For example, the predetermined relationship may require that the zeroth Fourier coefficients of sets 331 and 332 are equal. The predetermined relationship may also comprise that for at least some index, all of the Fourier coefficients of that index are equal. For example, the predetermined relationship may require that the zeroth Fourier coefficients of sets 331, 332, 333 and all other sets of Fourier coefficients are equal.

The relationship is preferably extended to more, or more preferably all share sets. For example, in an embodiment, an index is chosen for each set of Fourier coefficients, the relationship comprising that the chosen Fourier coefficients of those sets are equal. For example, if there are 16 sets, one may select 16 indices, one for each set, and require that the corresponding Fourier coefficients are equal. For example, the coefficients with indices 1, 5, 7, . . . , in the first, second, third set of Fourier coefficients, . . . , respectively, may be equal.

The stricter the requirement on the predetermined relationship the harder it is for an attacker to find a collision. For example, the predetermined relationship may be that each Fourier coefficient in a set of Fourier coefficients, except one, is equal to a respective Fourier coefficient in the other sets of Fourier coefficients; the one exception being used to represent the data element. One way to do this is to require that Fourier coefficients of the same index are equal, except for one index, say the zeroth index. For example, the first Fourier coefficients in sets 331, 332, 333, . . . , may be equal, the second Fourier coefficients in sets 331, 332, 333, . . . , may be equal, etc. The same types of relationships may be used in embodiments that have more than one representing element in its sets of Fourier coefficients, e.g., as shown in FIGS. 4a-4b.

The examples above do not impose relationships between Fourier coefficients in the same set. For example, for any internal state and any choice for one of the sets of shares, say any choice for set 321 or instead any choice for one of the sets of Fourier coefficients, say set 331, there is a way to choose the remaining set such that the internal state is validly represented and the relationship is satisfied. In other words, the number of valid representations of a single data element in the internal state is not reduced by requiring the relationship between the Fourier coefficients, but the number of valid representations of the entire internal state is.

Relationships can also be defined between Fourier coefficients within the same set of Fourier coefficients. This may reduce the number of valid representations of an internal state as a set of shares, but this may be acceptable. For example, the number of valid representation may still be large enough, in particular the number of valid representation may still be large enough to represent all entropy of the input data to the cryptographic operation, e.g., in case the entire internal state is represented in the set of Fourier coefficients. For example, a good choice is to pick Fourier coefficients with consecutive indices as protective elements, and set the values of said Fourier coefficients to predetermined, fixed values. It can mathematically be shown that in order to create a different set of Fourier coefficients with the predetermined values in, say, b consecutive Fourier coefficients, an attacker must change at least b+1 bytes of the set of shares. The predetermined, fixed values may be chosen randomly at compile time. In an embodiment, predetermined, fixed values are chosen which are not all equal.

One could also require that two or more of the Fourier coefficients within the same set are equal. This is a linear relationship which can be preserved in the affine operations. Equality is automatically preserved in parallel non-linear operations. There is a potential weakness if this type of relationship is the only relationship used, e.g., if the only requirement is that all non-representing data elements in a set of Fourier coefficients are equal. The reason is that an attacker could change the byte in the first symbol, e.g., index 0, and all Fourier coefficients would change with the same amount. In this case the set would be tampered with but the relationship could not detect it. One or more equality relationship could be used however in addition to other requirements, e.g., global relationships or one or more error detecting elements that have a fixed value.

Element in a set of Fourier coefficients received at the beginning of an affine operation that have a known value and/or a known affine or linear relationship (if the execution was not tampered with) can be mapped by an affine or linear operator to an all zero-vector, e.g., by selecting a linear operator for which the kernel comprises the expected values. The zero-vector can have any length, in particular, its length can be equal to the number of representing elements, to the number of all elements in the set of Fourier coefficients. In case the elements do not have their expected values or relationship the operator maps them to a distortion vector. The distortion vector is non-zero for at least one or more set of elements with an unexpected value or relationship, but preferably for all such elements. A different operator can map these elements with expected values or relationship to a further set of elements having further expected values or a further relationship. The further values and relationships may be different. The further elements may be used in a next representation of the internal set as error-detecting elements.

There can be a large choice in selecting the relationship. For example, assuming 16 data elements and n shares per set, using one Fourier coefficient per set as representing the data element and the rest for protection, one could have $n(n!)^{15}$ relationships, by selecting a Fourier coefficient in the first set to represent the data element (n choices), and ordering the other sets of Fourier coefficients to indicate which coefficient represents the data element and to which coefficients the rest are equal (n! choices). Selecting a random relationship from this large space further complicates the work of the attacker. For example, each device 100 could receive a different relationship, which could, e.g., also serve to watermark the device.

The operators are chosen such that they preserve the relationship. For linear operators, this can be done since the Fourier transformation is linear and the relationships are linear. Maintaining the relationships for non-linear operators can be done using the following insight. The mapping $X \mapsto \Sigma_{j=0}^{255} F_j * X^j$, where $X, F_0, \ldots, F_{255}$ are share sets, effectively maps Fourier coefficient $\hat{x}_k$ onto $\Sigma_{j=0}^{255} (\hat{f}_j)_k (\hat{x}_k)^j$, where $(\hat{f}_j)_k$ is the k-th Fourier coefficient of the share set $F_j$. In other words, the mapping on the set of shares translates to parallel polynomials on the Fourier coefficients. Thus, if two Fourier coefficients of the same index in different sets are equal, then this relationship is preserved simply by having the same mapping act on both sets of shares. For embodiments in which the same non-linear operator is applied to all data-elements in an internal state, and in which the relationship only implies equality relations for Fourier coefficients with the same index, preserving of the relationship is automatic, simply by applying the same mapping to all share sets. In this case, the share sets $F_j$ in $X \mapsto \Sigma_{j=0}^{255} F_j * X^j$ can be chosen as any share sets which happen to represent the correct polynomial coefficients for the cryptographic primitive. For example, one may select a random share set $F_j$ to represent a coefficient, e.g., at compile time.

Preserving other relationships can be done with an appropriate choice of the $F_j$. For example, suppose the first Fourier coefficient in sets 331 is equal to the second Fourier coefficient in set 332, according to the relationship. In this case, one may choose $(\hat{f}_j)_1$ of the non-linear operator acting on the set 331 equal to $(\hat{f}_j)_2$ of the non-linear operator acting on set 332 (for all j). In this way, the relationship is preserved. If, say, the zeroth Fourier coefficient corresponds to the actual value of the data element, then one may choose $(\hat{f}_j)_0$ for these sets according to the desired non-linear operation, e.g., the desired S-box, which is to be performed on the data-elements.

It is also possible to have a data element represented by a subset of the Fourier coefficients, e.g., to determine the data element, e.g., a subset with 2 or more elements may be used. For example, the data element may be equal to the sum of the zeroth and first Fourier coefficient. This can be implemented by selecting to polynomials, expressed through their coefficients $(\hat{f}_j)_0$ and $(\hat{f}_j)_1$, the sum of which is equal to the desired operation on data element, e.g., the desired S-box.

Relationships may also be enforced in case of a single set of shares. For example, in case of FIG. 4b one may require that the non-representing coefficients have a specific value, e.g., are zero, or some other value, e.g., a random value. In an embodiment with multiple non-representing coefficients, at least one, at least two, etc., non-representing elements are equal to a predetermined value or values. The predetermined values may vary from round to round. Even if there is only one set of shares having only one corresponding non-representing coefficients one may require that this coefficient has a particular value, e.g., that it is zero.

Note that any non-linear operation can be expressed as a polynomial. Even if the non-linear operators are defined using their Fourier coefficients, they are evaluated on (encoded) shares of a set of shares. For example, a power of a shares set may be computed as repeated convolutions of the share set with itself.

Updating an internal state in internal state storage 130 may involve non-linear and linear operators. FIG. 1 shows non-linear operations 141, 142, 143. The non-linear operations operating on an internal state may be arranged as separate non-linear operations, e.g., non-linear sub-operations, which act on a single one of the data elements of the internal state. For example, these sub-operations may be the same for all data elements, e.g., the same S-box, or they may be different. Even if the S-box which is performed on the level of the data-elements, say on the level of box 310, are the same, the operations which are performed on the level of the sets of shares, e.g., on box 320, or in the actual encoding on box 340 may be different, e.g., they may perform a different function for Fourier coefficients that are not part of the relationship, e.g., which are used to represent the data value. A non-linear operator acting on a single data-element acts only on the shares in the corresponding set of shares.

FIG. 1 shows linear operations 146, 147, 148. A linear operation updating the internal state act simultaneously on at least two sets of shares in the memory representing at least two data elements of the internal state. For example, a linear operation may be represented as a matrix, e.g., over the field with 2 elements (bits) or the larger finite field, e.g., $F_{256}$. Since both the relationships and the Fourier transform is a linear operation, the linear operation may be constructed by concatenating a Fourier operator producing a set of Fourier coefficients for each set of shares on which the linear operation acts,
one or more linear operators acting on the Fourier coefficients preserving the invariant, and
an inverse Fourier operator.

The input to the linear operation may be, e.g., a vector with as elements the shares of two or more sets of shares. For example, in so-far a linear operator acts on Fourier coefficients that represent the data value, they can perform the linear operation needed for the cryptographic primitive, e.g., as desired by a standard; but in so-far the one or more linear operators act only on Fourier coefficients that do not represent the data value, they can perform any linear operation, e.g., a random linear operation, so long as the relationship is preserved. Note that if, say due to a fault attack, the relationship was not satisfied in the first place, it is preferred that the relationship stays invalid, or at least that the chance of accidently restoring the relationship is not better than with a uniform random distribution.

For example, in an embodiment in which the relationship requires that Fourier coefficients with the same index are equal, except for the one (or more) Fourier coefficient that represents the data value, one may use the following:

a Fourier operator producing a set of Fourier coefficients for each set of shares on which the linear operation acts, the sets of Fourier coefficients being ordered with coefficients in the set having an index,
one or more linear operators only acting on Fourier coefficients of the same index, e.g., independent of Fourier coefficients of a different index, the one or more linear operators being arranged to act on Fourier coefficients preserving the invariant,
an inverse Fourier operator.

Such a separation of operators is possible, but not necessary. For example, the one or more linear operators could comprise one operator to act on the Fourier coefficients that represent the data element, e.g., acting on one or more Fourier coefficients per set, and one linear operator that acts on all the remaining Fourier coefficients, e.g., a random linear operation except for the requirement that it preserves the relationship.

Figure 4C:
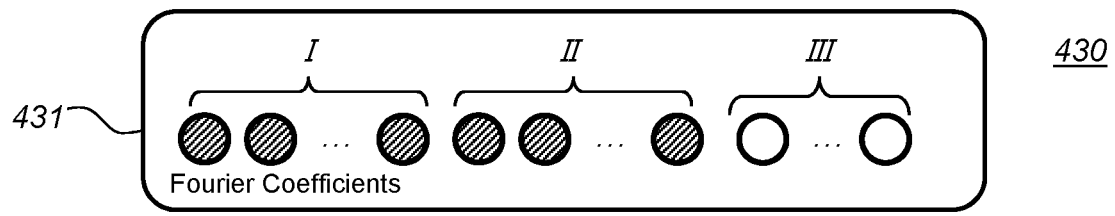

FIG. 4c gives a further example of a relationship. FIG. 4c shows a set of Fourier coefficients portioned into three parts, labeled with roman numerals I, II and III. Although FIG. 4c shows these parts consecutively, this is not necessary, e.g., the three parts could be distributed over the elements of set of Fourier coefficients 430 in any manner, e.g., randomly. Part III may be empty in this example.

The coefficients under label I represent the internal state. In this example, the entire internal state is represented in a single set of Fourier coefficients. The coefficients under label II also represent the internal state. In this example, the entire internal state is represented in a single set of Fourier coefficients twice. For example, in case of bytes and an internal state of 16 bytes one could use a set of 51, 85 or 255 shares. The updating of the internal state is done in the same manner for the coefficients II as for coefficients I, and both coefficients I and II are initiated from the input data in the same manner. The result is that after the last round both coefficients I and II contain the end result of the cryptographic operation. The output operator could use this by distorting the output in case the coefficients under I and II are not the same. For example, an output operator may map a set of shares to the data elements it represents plus a distortion. The distortion depends on the Fourier coefficients of the set of shares such that the distortion is zero if the Fourier coefficients in the two branches are equal.

In an embodiment, both parts I and II represent the entire internal state. For example, part I could be computed during updating from a corresponding part I in a previous encoding of the internal state and part II could be computed from a corresponding part II in a previous encoding of the internal state or vice versa (e.g. part I is computed from part II, and the other way around). The updating during non-final rounds could introduce a distortion if parts I and II are unequal, this could also be postponed until the final round, or until an output operator is applied.

It is not necessary that part I and II both contain the entire internal state. For example, part II may comprise only selected data elements of the internal state, e.g., bytes 4, 9, 10, and 13 (out of 0-15). In this case, the new part II may be computed from the previous part II extended with the missing data elements taken from part I.

The evaluation of the block cipher on parts I and II need not be in parallel, so that parts I and II in the same round are different. For example, one may execute an unequal number of dummy rounds on parts I and II before starting with the evaluation of the cryptographic operation itself. In this case parts I and II will be different, but at the end, once the two branches synchronize again, their values are equal. This is an example of a global relationship between the Fourier coefficients that cannot be checked locally. After synchronization occurs, an operator can introduce the distortion, but not earlier.

The non-representing coefficients III may be used to detect tampering using other means, e.g., by requiring that they are equal to a predetermined value, etc. In an embodiment, not all non-representing coefficients are equal. Note that even if the two branches I and II are equal, this will not be directly visible in the code. For one thing, the set of Fourier coefficients is only present in the form of a set of shares. A Fourier transform would be required on the set of shares to see if some of the Fourier coefficients are equal. But even the set of shares will generally not be visible in the code, as the shares in a set of shares are encoded. For example, separate and different encodings could be used for the different elements in a set of shares. For a grey box implementation, one could economize on the encodings used. For white box implementations, however, encoding of a set of shares would be needed, since otherwise an attack would only need to execute the known Fourier transform to obtain the representing coefficients.

In this particular case, although coefficients II do represent the internal state, they are still used as error-correcting. An advantage of using the input to initialize part II is that in this way entropy is introduced without using a random number generator.

Figure 4D:
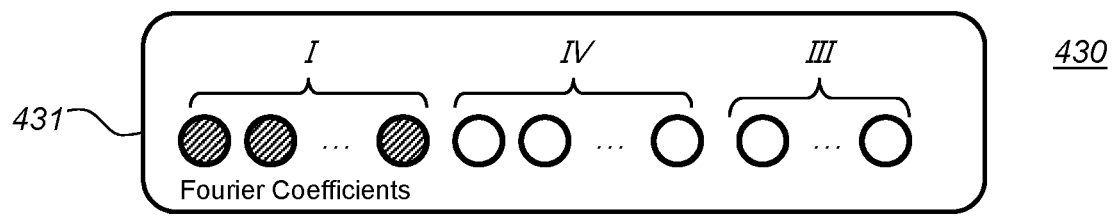

FIG. 4d shows a set of Fourier coefficients, wherein coefficients I and III are as in FIG. 4c. On coefficients IV a series of round functions is applied as part of the rounds, which round functions are chosen such that the concatenation of them is the identity. For example, one could evaluate AES as usual on the first half of the rounds, and use the inverse of AES for the second half of the rounds. The block cipher used need not be AES, but may be any block cipher, e.g., AES but with different affine and non-linear operators, e.g., a different s-box. The result is that after the final rounds, the coefficients IV are the same as the original input to coefficients IV. For example, one may select a fixed constant as input for coefficients IV, in which case the same input should occur on the output. One could also use the same input coefficients IV as for coefficients I, so that the original input is present at the output. The latter may be used by producing not the regular output, but the regular output plus (say xor) the input. To obtain the regular output one would have to subtract (say xor) the input.

Figure 4E:
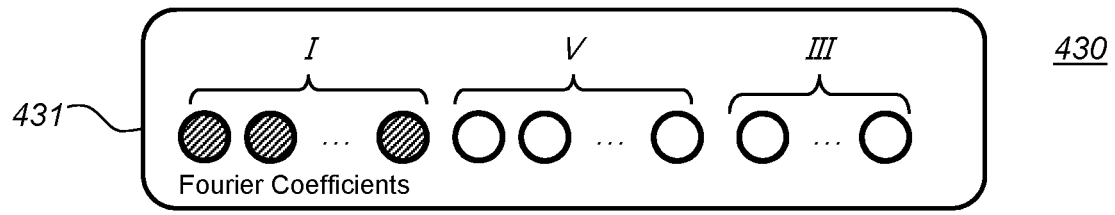

FIG. 4e shows a set of Fourier coefficients, wherein coefficients I and III are as in FIG. 4c. On coefficients V, a predetermined sequence of round functions is applied, applied to a fixed input constant. The result is that one can compute what the correct end result for coefficients V should be. For example, one could initialize coefficients V with all zeros and evaluate AES for it. The end result would be the AES evaluation of the initial input, in this case the all-zero input. Both in FIGS. 4d and 4e the output operator could distort if the expected values are not seen in coefficients IV or V. If AES is used for parts IV or V they may use an alternative random key. It is not necessary that parts IV and V have the same size as the internal state, they may be smaller. In such a case, one may operate on this part using a custom block cipher with a smaller input size. For example, one may modify AES to operate on a smaller input size by choosing smaller operators. For example, parts IV and V could be chosen to be 8 bytes instead of 16. They could be larger as well.

The examples given for FIGS. 4a-4e are examples of global relationships that are enforced over multiple rounds. For example, in case of FIGS. 4c 4e the parts I, II, IV and V may be different from one another.

Note that it may happen that a Fourier coefficient could both be regarded as a representing coefficient and as an error detection element. For example, consider the embodiment illustrated by FIG. 4c. One may regard the elements in part I as representing elements, since they determine the internal state. One may regard the elements in part II as error-detecting elements: These Fourier coefficients comprise redundant data since they are not needed to determine the internal state; Moreover, as the information in part II is fully determined by the information in part I they are error-detecting. If part I changes without the corresponding change in part II, or vice versa, an error is detected. However, one could equally well regard part II as the representing part, and part I as the error-detecting part. In an embodiment, one or more of the error detecting elements can be derived from the representing elements; in an embodiment one or more of the error detecting elements may be independent of the representing elements. For example, in an embodiment at least one of the error-detecting elements is equal to a representing element, and/or at least one of the error-detecting bits is equal to a predetermined value. For example, in an embodiment part of the elements in a set of Fourier coefficients corresponding to set of shares, represent element of the internal set and part are additional element suitable to detect modification to this or other sets of shares.

The examples above encode the internal state in a single part I of a single set of shares, but alternatively, one could divide the internal state over two or more sets of shares; the non-representing coefficients could be used in the same manner as parts II-V.

It is also noted that these ideas may be combined, or be combined with other white-box techniques. For example, a set of Fourier coefficients may contain multiple parts: one or more copies of the internal state, one or more parts which reproduce the input, and/or one or more parts that produce a fixed value. The output operator may distort if any of these relationships is not satisfied.

An advantage of combining multiple algorithms, e.g., multiple copies of a block cipher together in the same set or sets of shares, e.g., by representing at least part of two different internal states in a single set of shares is that no control flow is visible that indicates when which algorithm is operating. If branching and/or recombination rounds were visible, this might limit the search space of an attacker. He knows how many times he has to inject a fault at an internal state, namely the number of branches, and once in each branch.

Note that the low-level multiplications when evaluating the matrix product may be done by table-lookup if the shares are encoded. Alternatively, the decoding and re-encoding of shares may be integrated in the linear operation if the encodings are linear. The former may be more secure as it avoids linearities, but has the downside of significantly increasing the code size, e.g., as an increase in the number of tables or polynomials.

As noted, some of the operations may be keyed. For example, in an operation a round key may be added to all or part of the internal state. The key may be stored in device 100 in an encoded form. Preferably, the keys use the same type encoding as the internal state does, e.g., as set of (encoded) shares with restrictions imposed on the Fourier coefficients of the sets. For example, the key may be represented in a memory of device 100 as a corresponding set of shares, the set of shares satisfying the predetermined relationship between the Fourier coefficients corresponding to the set of shares of the key according to the discrete Fourier transform in the finite field.

Returning to FIG. 1, the figure further shows an input interface 110 arranged to receive the input data. For example, the input interface 110 may comprise a computer network connection, a computer storage unit, etc. Input interface 110 may comprise an application programming interface (API); further examples are given herein. In an embodiment, the input data may already be encoded in a manner suitable for the internal state. Below we will describe a situation in which the input interface is not encoded according to a private encoding. In that case device 100 may comprise an optional input operator 112 to the plain input data. Input operator 112 produces multiple sets of shares representing the initial internal state. The multiple sets of shares satisfying the predetermined relationship.

For example, the input operator may be constructed by concatenating a number of linear operators:
- an operator to map the input data to one or more sets of Fourier coefficients. If non-representing coefficients are used to satisfy some relationship, the input operator may be configured so that the input data is mapped to one or more sets of Fourier coefficients that satisfy the relationship. For example, the operator may map the input data to the Fourier coefficients that represent the data elements. For example, if a single Fourier coefficient per set represents the data element, the operator could map data elements of the input directly to the corresponding Fourier coefficient. If multiple Fourier coefficients together represent an input data element (e.g. as the sum), all but one of the Fourier coefficient may be selected at random, and the last one may be computed from the input data element and the selected random Fourier coefficients. For the remaining protective Fourier coefficients, random choices may be made satisfying the relationship. A random Fourier coefficient may be selected by applying a random operator to the input data. In white-box implementations it is often inadvisable to use a separate random number generator. For a grey-box implementation only, the random Fourier coefficients could be selected by a random number generator.
- an inverse Fourier transform, and
- an encoding operation, e.g., to encode each of the shares. The encodings may be chosen linear. There may be multiple different encodings. For example, for each one of the shares a different encoding may be used.

It has an advantage if the bit size of a share set is at least as large as the size of the input data. In this case, it is unlikely that a collision will occur, that is that two different input data will cause a collision on a share set. A better guarantee is obtained by making the input operator injective for each share set. That is, the input operator may be chosen such that the input data can be uniquely determined from the content of a single set of shares representing a single data element. For the case of AES, this can be achieved by taking 17 shares. In such an implementation of AES with 17 shares, all collisions are avoided, so it is expected to be fully secure against Mutual Information Analysis (MIA).

Device 100 further comprises an output operator 122 to derive the output data from a final internal state. Output operator 122 maps a set of shares to the data element(s) it represents plus a distortion. The distortion depends on the Fourier coefficients of the set of shares such that the distortion is zero if the Fourier coefficients satisfy the predetermined relationship. The output data may be plain output data, or output data encoded in an encoded form as expected by a next application that may make use of the output data. We will assume that the output data is plain output data.

For example, the output operator may be constructed by concatenating
- a decoding operator to remove an encoding of the internal state
- a Fourier transform to transform the internal state to one or more sets of Fourier coefficients
- an operator that maps those Fourier coefficients that represent a data element, to the data element they represent.
- an operator that maps the protective Fourier coefficients to a distortion, e.g., a distortion vector. The operator is constructed such that it maps Fourier coefficients that satisfy the relationship to 0, e.g., to no distortion. For example, vector(s) representing the relationship may be in the kernel of the operator.

Optionally, an encoding operator could be added in case a subsequent application expects the data to be delivered in an encoded form.

Below a detailed embodiment is given of a cryptographic primitive implemented in a cryptographic device or method according to the invention. The chosen cryptographic primitive is the AES block cipher, chosen as an illustration. The description below is for the encryption operation, however the decryption operation follows straightforward. The embodiments shown in detail below use a single representing Fourier coefficient for each set of Fourier coefficients. In total 16*17 bytes of encoding for the internal states are used.

Note that for many elements variant implementations are possible. It is possible to build an AES implementation with n shares, where n is a divisor of 255, with the property that before and after all AddRoundKey, ShiftRow, MixColumns and SubBytes operations (or their inverses for AES decryption), for each k, $1 \le k < n$, the k-th Fourier coefficients $(\hat{s}_k)_{r,c}$ of the share sets $S_{r,c}$ representing state byte $s_{r,c} = (\hat{s}_0)_{r,c}$ are equal for all row and column indices r,c. The row and column indices refer to a representation of the internal state of AES as a state array, e.g., with 4 rows and 4 columns. For the additive transformations AddRoundKey, ShiftRows and MixColumns this can be achieved by a suitable choice of the transformation on the Fourier coefficients, as will is detailed herein, while for the SubBytes operation this property can be guaranteed since the Fourier transform is compatible with polynomials acting on share sets. In this embodiment, one particular choice for the relationship is made. Moreover, the zeroth Fourier coefficient is used to represent a data element of internal state.

Suppose that, in such an implementation, an attacker changes a few shares in a share set, say $S_{0,0}$, in such a way that $(\hat{s}_0)_{0,0}$ is unchanged. Then at least one of the other Fourier coefficients $(\hat{s}_1)_{0,0}, \ldots, (\hat{s}_{n-1})_{0,0}$ must have changed (since otherwise he would not have changed anything). If before the change, for $1 \le k < n$, the k-th Fourier coefficients $(\hat{s}_k)_{r,c}$ of the 16 share sets $S_{r,c}$ that represent the 16 state bytes $s_{r,c}$, are all equal to each other, then after the change there is at least one value of k, $1 \le k < n$ such that the k-th Fourier coefficient of the changed share set $S_{0,0}$ is different from the k-th Fourier coefficient of the 15 other share sets.

When generating the AES output, which consists of 16 bytes, from the 16 share sets after the last AES operation, care must be taken to ensure that each output byte out, depends on $(\hat{s}_0)_{i \bmod 4, \lfloor i/4 \rfloor}$ and all $(\hat{s}_k)_{r,c}$, $1 \le k < n$, $0 \le r < 4$, $0 \le c < 4$, in such a way that the output is wrong (e.g.

out$_i \neq (\hat{s}_0)_{i \bmod 4, \lfloor i/4 \rfloor}$ for at least one value of i) when at least one $(\hat{s}_k)_{r,c}$ is different from the other $(\hat{s}_k)_{r',c'}$.

We note that this mechanism also makes a normal DFA attack more difficult: now the attacker's goal is to change some share set X in such a way that he can obtain information about the key from the way the output changes. But when this mechanism is in place, the only changes that the attacker can make that give outputs that he may consider useful, are those where he only changes the zeroth Fourier coefficient of a share set, and leaves the other Fourier coefficients invariant. If only a single Fourier component is to be changed, then all shares of X must be changed appropriately, which implies that the attacker needs to perform an n-th order DFA in order to be successful.

Here we present AES implementations that use the ingredients given before. The AES implementation transforms a 128-bit input into a 128-bit output at run time. The implementations are created at compile time. The security of the implementations depends mainly on the number of shares, n. We first give the details for constructing an AES encryption.

At compile time, the implementer does the following:
1. Choose the number of shares, n, where n is a divisor of 255. Choosing n=1 does not offer a security advantage over a default AES implementation, and n ∈ {51,85,255} may be too large to be practical, so preferably n ∈ {3,5,15,17}. The implementer also chooses an element $\Omega \in F_{256}$ with ord($\Omega$)=n. As noted, the choice n=17 is especially beneficial.
2. The implementer expands the AES key into the ($N_r+1$) round keys, as specified in the AES standard. Each round key consists of 16 bytes, arranged in a 4×4 array. The round key bytes are denoted $\hat{\kappa}_{i,j;0}^{(r)}$ with $0 \leq r \leq N_r, 0 \leq i < 4, 0 \leq j < 4$.

For each round index r, $0 \leq r \leq N_r$, the implementer randomly chooses n−1 bytes, denoted $\hat{\kappa}_k^{(r)}$ with $1 \leq k < n$. For each round r and position i, j, the implementer creates the n-component round key shares $K_{i,j}^{(r)}$ that have $\hat{\kappa}_{i,j;0}^{(r)}$ and $\hat{\kappa}_1^{(r)}, \ldots, \hat{\kappa}_{n-1}^{(r)}$ as Fourier coefficients, so that $K_{i,j}^{(r)} = (\kappa_{i,j;0}^{(r)}, \ldots, \kappa_{i,j;n-1}^{(r)})$ with $$\kappa_{i,j;m}^{(r)} = \hat{\kappa}_{i,j;0}^{(r)} + \sum_{k=1}^{n-1} \Omega^{-km} \hat{\kappa}_k^{(r)} \quad 0 \leq m < n.$$

3. For each round r, position i, j and each share index m, the implementer randomly chooses an invertible additive encoding $E_{i,j;m}^{(r)} \in E$. The size of the AES implementation grows linearly with the number of round encodings that are used. To reduce the size of the implementation, the implementer can choose to use the same encodings in each round, so that the encodings do not depend on r; he may also choose to alternate the encodings per round, so that the encodings depend on r only through r mod2. These choices have no effect on the security against the collusion and DFA attacks we consider—choosing a larger number of different encodings makes some white-box attacks harder. In each round r, the 16 n encodings $E_{i,j;m}^{(r)}$ are preferably all distinct. The inverse of $E_{i,j;m}^{(r)}$ will be denoted $D_{i,j;m}^{(r)}$.
4. The implementer calculates the encoded round key shares $\tilde{\kappa}_{i,j;m}^{(r)} = E_{i,j;m}^{(r)}(\kappa_{i,j;m}^{(r)})$ and creates the encoded key share sets $\tilde{K}_{i,j}^{(r)} = (\tilde{\kappa}_{i,j;0}^{(r)}, \ldots, \tilde{\kappa}_{i,j;n-1}^{(r)})$.
5. The implementer calculates encoded multiplication tables containing the bytes $\tilde{\mu}_{i,j;m_0^{e_0}m_1^{e_1}}^{(r)} = E_{i,j;(m_0+m_1) \bmod n}^{(r)}(D_{i,j;m_0}^{(r)}(2^{e_1}))$.

Here $0 \leq r < N_r$, $0 \leq m_0, m_1 < n$, $0 \leq e_0, e_1 < 8$. Since the multiplication tables satisfy the symmetry property $\tilde{\mu}_{i,j;m_0^{e_0}m_1^{e_1}}^{(r)} = \tilde{\mu}_{i,j;m_1^{e_1}m_0^{e_0}}^{(r)}$, the implementer may, for instance, choose to store only the elements of the multiplication tables with $e_0 \leq e_1$.

For example, one may implement the powers of two used above as 2^0=00000001, 2^1=00000010, 2^2=00000100, 2^3=00001000, 2^4=00010000, 2^5=00100000, 2^6=01000000, 2^7=10000000; these numbers or bit strings form a basis of the field.
6. For each $0 \leq r < N_r$, the implementer chooses a random share representation $S(0)^{(r)}$ of $S(0)$, the output of the S-box when the input equals 0, and random share representations $M_k^{(r)}$ of the polynomial coefficient $m_k$, for $0 \leq k < 8$, of the additive operator M in the S-box. The implementer encodes the shares of these representations, which gives position-dependent encoded share sets $\tilde{S}(0)_{i,j}^{(r)} = (E_{i,j;0}^{(r)}(s(0)_0^{(r)}), \ldots, E_{i,j;n-1}^{(r)}(s(0)_{n-1}^{(r)}))$
and $\tilde{M}_{k,i,j}^{(r)} = (E_{i,j;0}^{(r)}(m_{k;0}^{(r)}), \ldots$
$E_{i,j;n-1}^{(r)}(m_{k;n-1}^{(r)}))$.

7. For any round index $0 \leq r < N_r$, the implementer creates an additive operator $\tilde{L}^{(r)}$ on 16 n bytes as $\tilde{L}^{(r)} = E^{(r+1)}F^{-1}T^{-1}L^{(r)}TFD^{(r)}$, where For any round index r, $0 \leq r \leq N_r$, $D^{(r)}$ is defined as the operator that takes as input a vector $(B_0, \ldots, B_{16n-1})$ of 16 n bytes, and, for $0 \leq i, j < 4$ and $0 \leq m < n$, applies $D_{i,j;m}^{(r)}$ to $B_{n(i+4j)+m}$;

For any round index r, $0 \leq r < N_r$, $E^{(r)}$ takes as input a vector $(B_0, \ldots, B_{16n-1})$ of 16 n bytes, and, for $0 \leq i, j < 4$ and $0 \leq m < n$, applies $E_{i,j;m}^{(r)}$ to $B_{n(i+4j)+m}$;

F takes as input a sequence of 16 n bytes $(B_0, \ldots, B_{16n})$ and, for each i, j, sets $X = (B_{n(i+4j)}, \ldots, B_{n(i+4j)+n-1})$, applies the Fourier transform to X and sets $(B_{n(i+4j)}, \ldots, B_{n(i+4j)+n-1}) \leftarrow (\hat{x}_0, \ldots, \hat{x}_{15})$.

T takes as input a vector of 16 bytes $(\tilde{B}_0, \ldots, \tilde{B}_{16n-1})$, and permutes them into the sequence $(\tilde{B}'_0, \ldots, \tilde{B}'_{16n-1})$, where $\tilde{B}'_{16m+i} = \tilde{B}_{in+m}$, for $0 \leq i < 16$, $0 \leq m < n$;

$L^{(r)}$ takes as input a vector of 16 bytes $(\tilde{B}'_0, \ldots, \tilde{B}'_{16-1})$ and, for each k with $0 \leq k < n$, applies transformation $L_k^{(r)}$ to the 16-byte vector $(\tilde{B}'_{16k}, \ldots, \tilde{B}'_{16k+15})$.

The transformation $I_0^{(r)}$ puts its input $(\tilde{B}'_0, \ldots, \tilde{B}'_{15})$ into a 4×4 matrix A with $A_{i,j} = \tilde{B}'_{i+4j}$, $0 \leq i, j < 4$. If $0 \leq r < N_r-1$, it applies the MixColumns◦ShiftRows operation to A; if $r = N_r-1$, it applies the ShiftRows operation to A. It then outputs the 16 bytes of A column-wise.

For $1 \leq k < n$, the transformation $L_k^{(r)}$ is a randomly chosen additive invertible transformation on 16 bytes with the property that, when acting on a 16-byte vector whose entries are all equal, it outputs a 16-byte vector whose entries are all equal. It is shown in below how such transformations can be generated efficiently.

8. The implementer constructs an additive operator $\tilde{U}_{in}$, operating on 16 bytes and outputting 16 n bytes, as $\tilde{U}_{in} = E^{(0)}F^{-1}T^{-1}U_{in}$, where $$U_{in}(B_0, \ldots, B_{15}) = \left( B_0, \ldots, B_{15}, \underbrace{R_{in,1}(B_0, \ldots, B_{15}), \ldots, R_{in,1}(B_0, \ldots, B_{15})}_{16 \text{ times}}, \ldots, \right.$$

-continued $$\underbrace{R_{in,n-1}(B_0, \ldots, B_{15}), \ldots, R_{in,n-1}(B_0, \ldots, B_{15})}_{16 \text{ times}}\Biggr)$$

and each $R_{in,k}$, $1 \le k < n$, is a random additive operator acting on 16 bytes and outputting one byte; it is repeated 16 times in $U_{in}$. A good method for constructing the operators $R_{in,k}$ is to choose a random invertible operator R on 16 bytes, and let $R_{in,k}(B_0, \ldots, B_{15}) = B_{k-1}'$ where $(B_0', \ldots, B_{15}') = R(B_0, \ldots, B_{15})$. When n=17, this construction guarantees that there is a bijection between the 16 input bytes $(B_0, \ldots, B_{15})$ and 16 bytes $(R_1(B_0, \ldots, B_{15}), \ldots, R_{16}(B_0, \ldots, B_{15}))$. It follows that there is a bijection between the 16 input bytes and the 16 Fourier coefficients $\hat{s}_1, \ldots, \hat{s}_{16}$ with non-zero indices of the share set representing any state byte, so that different inputs always give different share sets: there are no collisions.

9. The implementer constructs an operator $\tilde{U}_{out}$ as $\tilde{U}_{out} = U_{out} TFD^{(N_r)}$ where $$U_{out}(B_0, \ldots, B_{16n-1}) = (B_0, \ldots, B_{15}) + \sum_{k=1}^{n-1} R_{out,k}(B_{16k}, \ldots, B_{16k-15}),$$

where each $R_{out,k}$, $1 \le k < n$, is a random additive operator acting on 16 bytes and outputting 16 bytes, with the property that when acting on a 16-byte vector of which all entries are the same, the all-zero vector is output.

The implementer builds an AES encryption program that uses the operators $\tilde{U}_{in}$, $\tilde{L}^{(r)}$ and $\tilde{U}_{out}$, the encoded key shares $\tilde{K}_{i,j}^{(r)}$, the encoded multiplication tables $\tilde{\mu}_{i,j;m_0,e_0,e_1}^{(r)}$, the S-box offset shares $\tilde{S}(0)_{i,j}^{(r)}$ and linear transformation constant shares $\tilde{M}(0)_{k,i,j}^{(r)}$. Using the multiplication tables, the implementer creates the functions Mul, Conv and Square.

The function Mul multiplies two individually encoded shares x and y, with respective indices $m_x$ and $m_y$, encoded according to the encodings of shares $m_x$ and $m_y$, in round r and position i, j, and returns the encoded result encoded according to the encoding of share index $(m_x+m_y)$ mod n in round r and position i, j. Note that in a convolution with n shares, the product $x_{m_x}y_{m_y}$ shows up in the share $z_{m_x+m_y \mod n}$ of z=xy. The position i, j is the position in the 4×4 array of the AES state. A pseudocode implementation is Mul(r,i,j,$m_x$,$m_y$,x,y):
find bits $\xi_0, \ldots, \xi_7$ such that $x = \sum_{k=0}^{7} \xi_k 2^k$
find bits $\eta_0, \ldots, \eta_7$ such that $\eta = \sum_{k=0}^{7} \eta_k 2^k$
return $\sum_{e_x=0}^{7} \xi_{e_x} \sum_{e_y=0}^{7} \eta_{e_y} \tilde{\mu}_{i,j;m_x,m_y,e_x,e_y}^{(r)}$
where the summations are over $F_{256}$.

The function Conv returns the encoded convolution of two encoded share sets, $X=(x_0, \ldots, x_{n-1})$ and $Y=(y_0, \ldots, y_{n-1})$, according to the encodings in round r at position i, j. A pseudocode implementation is Conv (r,i,j,X,Y):
$Z \leftarrow (0, \ldots, 0)$
for $0 \le m_x < n$
for $0 \le m_y < n$
$z_{(m_x+m_y) \mod n} \leftarrow z_{(m_x+m_y) \mod n} + \text{Mul}(r,i,j,m_x,m_y,x_{m_x},y_{m_y})$
return Z
where the summation is over $F_{256}$.

The function Square returns the encoded convolution of encoded share set $X=(x_0, \ldots, x_{n-1})$ with itself, according to the encodings in round r and position i,j. A pseudocode implementation is Square (r,i,j;X):
$Z \leftarrow (0, \ldots, 0)$
For $0 \le m_x < n$
$z_{(2m_x) \mod n} \leftarrow z_{(2m_x) \mod n} + \text{Mul}(r,i,j,m_x,m_x,x_{m_x},x_{m_x})$
return Z
where the summation is over $F_{256}$.

Using these functions as subroutines, the implementer creates the function Inverse, which returns the 254-fold encoded convolution of encoded share set X with itself, according to the encodings in round r and position i,j. A pseudocode implementation is Inverse (r,i,j;X):
$Y \leftarrow \text{Square}(r,i,j,X)$
$Z \leftarrow \text{Conv}(r,i,j,X,Y)$
$Y \leftarrow \text{Square}(r,i,j,Y)$
$X \leftarrow \text{Conv}(r,i,j,Y,Z)$
$Y \leftarrow \text{Square}(r,i,j,Y)$
$Z \leftarrow \text{Conv}(r,i,j,X,Y)$
$Z \leftarrow \text{Square}(r,i,j,Z)$
$Z \leftarrow \text{Square}(r,i,j,Z)$
$Z \leftarrow \text{Square}(r,i,j,Z)$
$Y \leftarrow \text{Conv}(r,i,j,X,Z)$
$Y \leftarrow \text{Square}(r,i,j,Y)$
return Y The function ShareSbox returns an encoded share representation of the output of the S-box operator, acting on an encoded share set X by means of convolutions that are encoded according to the encodings in round r and position i, j. A pseudocode implementation is ShareSbox(r,i,j,X):
$Y \partial \text{Inverse}(r,i,j,X)$
$Z \leftarrow \text{Conv}(r,i,\tilde{M}_{0;i,j}^{(r)},Y)$
for $1 \le k < 8$
$Y \leftarrow \text{Square}(r,i,j,Y)$
$Z \leftarrow Z + \text{Conv}(r,i,j,Y)$
$Z \leftarrow Z + \tilde{S}(0)_{i,j}^{(r)}$
return Z The function SubShares applies the function ShareSbox to each share set, as per the following pseudocode.

SubShares (r, $B_0, \ldots, B_{16n-1}$);
for $0 \le i < 4$
for $0 \le j < 4$
$(B_{n(i+4j)}, \ldots, B_{n(i+4j)+n-1}) \leftarrow \text{ShareSbox}(r,i,j,$
$(B_{n(i+4j)}, \ldots, B_{n(i+4j)+n-1}))$
return $(B_0, \ldots, B_{16n-1})$ The AES encryption function AES encrypts the plain 16-byte input $(in_0, \ldots, in_{15})$ and returns the plain 16-byte result $(out_0, \ldots, out_{15})$. An implementation in pseudocode is AES $(in_0, \ldots, in_{15})$;
$(B_0, \ldots, B_{16n-1}) \leftarrow \tilde{U}_{in}(in_0, \ldots, in_{15})$
for $0 \le r < N_r$
for $0 \le i < 4$
for $0 \le j < 4$
$(B_{n(i+4j)}, \ldots, B_{n(i+4j)+n-1}) \leftarrow (B_{n(i+4j)}, \ldots, B_{n(i+4j)+n-1}) + \tilde{K}_{i,j}^{(r)}$
$(B_{n(i+4j)}, \ldots, B_{n(i+4j)+n-1}) \leftarrow \text{ShareSbox}(B_{n(i+4j)}, \ldots, B_{n(i+4j)+n-1})$
$(B_0, \ldots, B_{16n-1}) \leftarrow \tilde{L}^{(r)}(B_0, \ldots, B_{16n-1})$ for $0 \leq i < 4$
for $0 \leq j < 4$
$(B_{n(i+4j)}, \ldots, B_{n(i+4j)+n-1}) \leftarrow (B_{n(i+4j)}, \ldots, B_{n(i+4j)+n-1}) + \tilde{K}_{i,j}^{(N_r)}$
$(out_0, \ldots, out_{15}) \leftarrow \tilde{U}_{out}(B_0, \ldots, B_{16n-1})$
return $(out_0, \ldots, out_{15})$ An important feature of the AES program with 17 shares is that for any encoded share set representing a state byte, there exists a bijection between the 16 input bytes and the first to sixteenth Fourier coefficients of the decoded share set. This implies that for two different inputs there can never be a simultaneous collision on the 17 shares in any such share set, so that MIA/Collision attacks won't be successful. More generally, in an embodiment, the internal state of a previous round may be derived from a set of shares in the next round, using knowledge of the implementation (encodings, keys, etc.). For example, in an embodiment there is a bijection between the unencoded (without shares) internal state (or the input) in a round, and a share set of the encoded internal state in the next round.

The construction above uses random additive operators with certain prescribed properties, which are defined at compile time. Here we show how this could be done efficiently. Since a byte is a concatenation of 8 bits, there is a one-to-one mapping between additive operators on $N_{bytes}$ bytes and binary matrices of size $N \times N$, where $N = 8N_{bytes}$.

Generating a random invertible binary matrix of arbitrary size $N \times N$. The algorithm consists of the following steps:
1. Construct a binary matrix L of size $N \times N$ with ones on the diagonal, zeroes above the diagonal and random bits below the diagonal.
2. Construct a binary matrix U of size $N \times N$ with ones on the diagonal, zeroes below the diagonal and random bits above the diagonal.
3. Return $A = LU$.

Generating a random invertible binary matrix of size $8N_{bytes} \times 8N_{bytes}$ with the property that when acting on an $N_{bytes}$-times repeated sequence of 8 bits it results in an $N_{bytes}$-times repeated sequence of 8 bits. The algorithm consists of the following steps:
1. Construct random invertible binary matrix A of size $8 \times 8$.
2. Construct a random binary matrix B of size $8 \times 8(N_{bytes}-1)$.
3. Construct a random invertible binary matrix C of size $8(N_{bytes}-1) \times 8(N_{bytes}-1)$.
4. Let R be the block matrix $$R = \begin{pmatrix} A & B \\ 0 & C \end{pmatrix}.$$

5. Construct a random binary matrix L' of size $8(N_{bytes}-1) \times 8(N_{bytes}-1)$ with ones on the diagonal, zeroes above the diagonal and random bits below the diagonal.
6. Construct the block matrix D of size $8(N_{bytes}-1) \times 8$ by stacking L copies of the $8 \times 8$ identity matrix $I_{8 \times 3}$.
7. Construct the block matrix $$L = \begin{pmatrix} I_{8 \times 8} & 0 \\ D & L' \end{pmatrix}.$$

8. Return $A = LRL^{-1}$.

Generating a random binary matrix of size $8N_{bytes} \times 8N_{bytes}$ with the property that when acting on an $N_{bytes}$-times repeated sequence of 8 bits it results in the all-zero bit sequence.
1. Let the matrix A be the zero matrix of size $8 \times 8$.
2. Execute Steps 2-8 of the algorithm in Section 4.2.

The following numbered clauses include embodiments that are contemplated and nonlimiting:
1. An electronic cryptographic device arranged to perform a cryptographic operation on input data obtaining output data, the cryptographic device comprising
   an input interface arranged to receive the input data,
   a memory arranged to store an internal state, the internal state comprising one or more data elements, each data element being represented in the memory as a corresponding set of shares, a set of shares in the memory having a corresponding set of Fourier coefficients according to a discrete Fourier transform in a finite field, the sets of Fourier coefficients corresponding to the sets of shares in the memory satisfying a predetermined relationship among them,
   a processor circuit configured to
      perform the cryptographic operation by repeatedly updating the internal state, an initial internal state being derived from the input data, the output data being derived from a final internal state, updating the internal state being arranged so that an updated set of Fourier coefficients corresponding to the share sets of the updated internal state satisfies the predetermined relationship among them as an invariant,
      apply an output operator to the final internal state to derive the output data, the output operator mapping a set of shares to the data element it represents plus a distortion, said distortion depending on the Fourier coefficients of the set of shares such that the distortion is zero if the Fourier coefficients satisfy the predetermined relationship.
2. A cryptographic device as in Clause 1, wherein a set of shares represents a data element which is determined by a subset of the Fourier coefficients corresponding to said set of shares.
3. A cryptographic device as in Clause 1 or 2, wherein a set of shares represents a data element which is equal to one of the Fourier coefficients corresponding to said set of shares.
4. A cryptographic device as in any one of the preceding clauses, wherein the predetermined relationship comprises that at least two Fourier coefficients of different sets of Fourier coefficients are equal.
5. A cryptographic device as in Clause 4, wherein each Fourier coefficient in a set of Fourier coefficients, except one, is equal to a respective Fourier coefficient in the other sets of Fourier coefficients.
6. An electronic cryptographic device as in any one of the preceding clauses, wherein updating the internal state comprises applying non-linear operations to the data elements of the internal state, a non-linear operation being arranged to act on a data element of the internal state by acting on shares in the memory in the corresponding set of shares that represents the data element.
7. A cryptographic device as in Clause 6, wherein the non-linear operation is a polynomial in the finite field, the processor circuit being arranged to computed powers of a shares set as convolutions of the share set with itself.

8. An electronic cryptographic device as in any one of the preceding clauses, wherein updating the internal state comprises applying linear operations to the internal state, the linear operating simultaneously on at least two sets of shares in the memory representing at least two data elements of the internal state.

9. A cryptographic device as in Clause 8, wherein the linear operation is constructed by concatenating
a Fourier operator producing a set of Fourier coefficients for each set of shares on which the linear operation acts, the sets of Fourier coefficients being ordered with coefficients in the set having an index,
one or more linear operators acting on Fourier coefficients of the same index independent of Fourier coefficients of a different index, the one or more linear operators being arranged to act on Fourier coefficients preserving the invariant,
an inverse Fourier operator.

10. A cryptographic device as in any one of the preceding clauses, wherein performing the cryptographic operation comprising adding a key to all or part of the internal state, said key being represented in the memory as a corresponding set of shares, the set of shares satisfying the predetermined relationship between the Fourier coefficients corresponding to the set of shares of the key according to the discrete Fourier transform in the finite field.

11. A cryptographic device as in any one of the preceding clauses, wherein the combined bit size of a set of shares is at least as large as the bit-size of the input data.

12. A cryptographic device as in any one of the preceding clauses, wherein the cryptographic operation is a block cipher.

13. A cryptographic device as in any one of the preceding clauses, wherein the shares in a set of shares representing a data element are encoded with linear encodings.

14. A cryptographic device as in any one of the preceding clauses, wherein the processor circuit is arranged to apply an input operator to plain input data, said input operator producing multiple sets of shares representing the initial internal state, the multiple sets of shares satisfying the predetermined relationship.

15. An electronic cryptographic method (500) to perform a cryptographic operation on input data obtaining output data, the cryptographic method comprising
receiving (510) the input data,
storing (530) an internal state, the internal state comprising one or more data elements, each data element being represented in the memory as a corresponding set of shares, a set of shares in the memory having a corresponding set of Fourier coefficients according to a discrete Fourier transform in a finite field, the sets of Fourier coefficients corresponding to the sets of shares in the memory satisfying a predetermined relationship among them,
performing (541, 546) the cryptographic operation by repeatedly updating the internal state, an initial internal state being derived from the input data, the output data being derived from a final internal state, updating the internal state being arranged so that an updated set of Fourier coefficients corresponding to the share sets of the updated internal state satisfies the predetermined relationship among them as an invariant,
apply (522) an output operator to the final internal state to derive the output data, the output operator mapping a set of shares to the data element it represents plus a distortion, said distortion depending on the Fourier coefficients of the set of shares such that the distortion is zero if the Fourier coefficients satisfy the predetermined relationship.

16. A computer readable medium (1000) comprising transitory or non-transitory data (1020) representing instructions to cause a processor system to perform the method according to clause 15.

Below further detailed embodiments are given of a cryptographic primitive implemented in a cryptographic device or method according to the invention. The chosen cryptographic primitive again is the AES block cipher, chosen as an illustration. The description below is for the encryption operation, however the decryption operation follows straightforwardly. The embodiments shown in detail below represent an entire AES internal state in a single set of shares. Furthermore, various advantages of representing more than data element of an internal state in the set of shares are discussed.

This embodiment deals with two independent problems. Firstly, Higher Order Masking as a countermeasure against White-box or Grey-box attacks comes with a significant price in complexity and consequently runtime and/or storage. There is a risk that an implementation of an algorithm wherein each encoding contains two independent variables, herein referred as ω, σ, may be attacked by a decomposition attack. These two problems are further addressed in the embodiments below.

As discussed herein, in order to thwart a share reduction attack, one may add an invariant on top of the shares based on the Fourier Transform. For example, let $s=s_0, \ldots, s_{15}$ denote the AES state in a certain round. Each $s_i$ may be represented by 17 shares, say $x^i = x_0^i, \ldots, x_{16}^i$. Such that the zero-th Fourier Coefficient of $x^i = s_i$, the state-byte. The other 16 Fourier Coefficients may be used to define the invariant. The invariant could be chosen to be bijective to the whole input (mitigating MIA). The invariant may be used to mitigate both the share reduction attack and DFA.

Next to DFA and MIA, also decomposition attacks are a threat in table-driven implementations where two algorithms are executed in parallel under a single joint encoding. For an example of decomposition see (included herein by reference): A. Biryukov and A. Shamir.: *Structural cryptanalysis of SASAS*. The two parts on which the two algorithms are executed are denoted by ω and σ. The usage of these joint encodings is two-fold: firstly, it thwarts an attacker that tries to reverse engineer tables, since a table now consists of multiple operations. Secondly, by tying these paths together, we obtain protection against MIA and DFA.

It is however a problem if a decomposition attack could be launched to separate the ω and σ paths. Indeed, a table involving non-linear operations on both an co-unit and a σ-unit will be decomposed into two tables corresponding to a single operation, which depends on either ω or σ, hence the security offered by joining ω and σ is broken. Joint encoding as discussed below helps against: decomposition attacks on tables in implementations where parallel algorithms are jointly encoded, revealing branching and linear recombination in parallel algorithm executions, and reduces time and memory complexity.

This idea can be expressed as follows, let f: $\{0,1\}^{2n} \to \{0,1\}^{2n}$, where $f(x) = f_\omega(\omega(x)) \| f_\sigma(\sigma(x))$ for some $f_\omega$ and $f_\sigma$ operating over n-bits and where $\omega(\cdot)$ extracts the "ω-part of x" and $\sigma(\cdot)$ extracts the "σ-part of x". Let $\alpha > 2$ be a divisor of $2^n - 1$.

Let $p_\omega(\mu) = \Sigma_{i=0}^{2^n-1} c_i^\omega \mu^i$ denote the polynomial representation of $f_\omega$ and $p_\sigma(\mu) = \Sigma_{i=0}^{2^n-1} c_i^\sigma \mu^i$ the polynomial representation of $f_\omega$. Given powers $u=\mu^0, \ldots, \mu^{2^n-1}$, the remainder of the computation of $f_\omega$ is in the inner-product between $c^\omega = c_0^\omega, \ldots, c_{2^n-1}^\omega$ and u, which is linear given $c^\omega$.

Pick positions $0 \le i_\omega < \alpha$ and $0 \le i_\sigma = \alpha$ such that $i_\omega \ne i_\sigma$. Create a shares for x such that the $i_\omega$'th Fourier Coefficient equals $\omega(x)$ the $i_\sigma$'th Fourier Coefficient contains $\sigma(x)$ respectively.

Using a convolution network all required powers of $\omega(x)$ and $\sigma(x)$ can be computed. By applying a linear transformation matrix representing the coefficients of the polynomials ($\{c_i^\omega\}_i$ and $\{c_i^\sigma\}_i$) on the results one can evaluate the two polynomials.

Branching and linear recombination can be represented as the following operations:
- copy current state into multiple states,
- run separate threads of the algorithm in all copies,
- pick a linear map f with the property that $f(x_1, \ldots, x_n) = x_1$ if and only if $x_1 = x_2 = \ldots = x_n$
- apply f on the result of all branches.

Note that copying can be implemented as copying the value of one Fourier Coefficient in another, which is linear. Also, applying f is by construction linear. So, these two steps can be applied by putting them in a linear transformation matrix properly hiding these operations. Finally, evaluating all threads in parallel on the Fourier Coefficients can be done by ensuring that the affine operations are the same on each thread.

The inversion part of the S-box computes an inverse of all Fourier Coefficients. The affine part of AES can be implemented to act on Fourier Coefficients as well. That is: adding keys, values of different Fourier Coefficients to each other can be embedded in one Affine Transformation. Hence, one could implement AES as follows:

Introduction: copy the input to the first 16 Four Coefficients of the share set (requires at least 17 shares)
Implement ShareSbox, e.g., as described above
Implement Key, e.g., as described above
Implement Linear Transformation $L_i$ such that ShiftRows and MixColumns are applied to the corresponding Fourier Coefficients
Reconstruction: ciphertext is represented by the first 16 Fourier Coefficients of the result.

With respect to MIA: because of Fourier Transform all shares are required to recover one AES-state byte and each set of shares in the program depends by construction on all input bytes. With respect to DFA: introducing one Fault to one byte, all Fourier Coefficients are touched because of the Fourier Transform. A successful fault injection requires that only one of the first 16 Fourier Coefficients is touched. One can show that this requires an attacker to hit at least 9 shares in the correct way.

Compared to the above implementation on 16*17 shares, this embodiment with just 17 shares and linear encodings has weaker MIA protection. This is because a MIA attack exists checking affinity of some intermediate value, e.g., the share set, representing the result of the first round S-box. This attack may be thwarted though by having a random input-dependent offset to the affine encoding of a share set, e.g., obtained by the Fourier Coefficient not used to compute AES-state bytes. In this approach on 17 shares we have only one non-representing coefficient left.

On the other hand, in a further embodiment one could use 51 shares instead of 17 to describe a full AES state, which will resolve this weakness. Compared to a 16*17 byte representation, still a gain in performance is obtained. For each convolution: the former requires $16 \cdot 17^2$ multiplications, while an implementation on 51 shares needs only $51^2 = 9 \cdot 17^2$ multiplications. Moreover, the Linear Transformations in the 16*17 byte representation require matrices comprising $16^2 \cdot 17^2$ bytes, compared to $51^2 = 3^2 \cdot 17^2$ bytes for the implementation with 51 shares.

As yet a further alternative, one could use non-linear encodings on 17 shares to resolve this weakness. In this case the relatively simple matrix multiplications may be replaced, e.g., with a circuit of table lookups.

We will describe an example implementation for AES, where each set of 51 shares corresponds to two AES states. So, two AES branches are combined in a single set of 51 shares.

Let $p_0, \ldots, p_{15}$ denote the plaintext and $c_0, \ldots, c_{15}$ the final ciphertext. Let bin: GF $(256) \to \{0,1\}^8 \times \{0,1\}^8$ denote a function that transforms a field element $\beta$ into the matrix corresponding to multiplication with $\beta$. That is, we fix a basis $\alpha_0, \ldots, \alpha_7$ for GF (256). For $(x_0, x_1, \ldots, x_7) \in \{0,1\}^8$, we have that $\beta \Sigma_{i=0}^7 x_i \alpha_i = \Sigma_{i=0}^7 y_i \alpha_i$ where $(y_0, \ldots, y_7) = (x_0, \ldots, x_7) \text{bin}(\beta)$. Furthermore, let $\alpha$ be an 51-th primitive root of the AES's finite field. Let F: $\{0,1\}^{408} \times \{0,1\}^{408}$ denote the binary matrix corresponding to the Fourier Transform:

$$F = \begin{pmatrix} \text{bin}(1) & \text{bin}(1) & \ldots & \text{bin}(1) \\ \text{bin}(1) & \text{bin}(\alpha) & \ldots & \text{bin}(\alpha^{50}) \\ \vdots & \vdots & \vdots & \vdots \\ \text{bin}(1) & \text{bin}(\alpha^j) & \ldots & \text{bin}(\alpha^{50j}) \\ \vdots & \vdots & \vdots & \vdots \\ \text{bin}(1) & \text{bin}(\alpha^{50}) & \ldots & \text{bin}(\alpha) \end{pmatrix}.$$

The dimension of F is 408 since this is 51*8; this matrix acts on the bits of a 51-byte set of shares. Furthermore, Id denotes the 128×128 bit identity matrix and the linear transformation of the S-box acting on all state bytes is represented by the 128×128 bit matrix $L_S$ and the 128-bit S-box offset to all state bytes is denoted by $b_S$, with 0 we denote the 128-bit all zero vector. We denote by M the 128×128 bit matrix representing AES's ShiftRows and MixColumns, and with Mc the 128×128 bit matrix representing MixColumns.

STEP 1: Choose a Circuit.

We will implement two AES branches, having the following structure:

| | 0 | 1 | 2 | 3 | 4 | 5 | 6 | 7 | 8 | 9 | 10 | 11 | 12 | 13 | 14 | 15 | 16 | 17 | 18 | 20 |
|---|---|---|---|---|---|---|---|---|---|---|---|---|---|---|---|---|---|---|---|---|
| ω | $D_0$ | $D_0^{-1}$ | $R_\omega$ | $R_1$ | $R_2$ | $R_3$ | $R_4$ | $R_5$ | $R_6$ | $R_7$ | $R_8$ | $R_9$ | $R_{10}$ | $R_{11}$ | $R_{12}$ | $D_3$ | $D_3^{-1}$ | $R_{12}^{-1}$ | $R_{11}^{-1}$ | $MC^{-1}$ |
| σ | $D_1$ | $D_2$ | $D_2^{-1}$ | $D_1^{-1}$ | $R_0$ | $R_1$ | $R_2$ | $R_3$ | $R_4$ | $R_s$ | $R_6$ | $R_7$ | $R_8$ | $R_9$ | $R_{10}$ | $R_{11}$ | $R_{12}$ | $D_4$ | $D_5$ | $MC^{-1}$ |

In the table above, the first row contains the round numbers. The second and third row refer to the two branches of AES. Note that this implementation of AES uses 20 rounds due to the addition of dummy rounds: $D_0$–$D_5$, $R_{11}$–$R_{12}$. The results at the end of round 16 for the two branches of AES should be equal. This equality is verified by introducing a distortion in case the two branches are not equal. For example, this may be done in the affine part of round 17. For the dummy rounds, one could use a regular AES round except with different keys, e.g., random keys.

STEP 2: Choose Random Encodings.
1. Choose 20*51 invertible matrices of size 8×8 bits, say $E_{i,j}$ for i=0, . . . ,19 and j=0, . . . ,50.
2. Define $E_i$=diag ($E_{i,0}$, . . . , $E_{i,19}$), for i=0, . . . ,19.
3. $D_i E_i^{-1}$.

STEP 3: Create Input Transformation.
1. For i=0, . . . ,18 choose random linear mappings $U_i$:$\{0,1\}^{128} \to \{0,1\}^8$.
2. Define $I_j$ the 8×128 matrix corresponding to $I_j(\text{bin}(x_0), \ldots, \text{bin}(x_{15}))=\text{bin}(x_j)$.
3. Define $$L_I = \begin{pmatrix} I_0 \\ \vdots \\ I_{15} \\ U_0 \\ \vdots \\ U_{18} \\ I_0 \\ \vdots \\ I_{15} \end{pmatrix}$$

STEP 4: Create Dummy Round Transformations and Keys
1. For j=0, . . . ,5:
generate an 128×128 random invertible binary matrix $L_{D_j}$.
generate a 128 bit random binary vector $K_{D_j}$.

STEP 5: Create Round Keys
1. given 128 bit key K, compute the Round keys $K'_0$=K, . . . ,$K'_{10}$ following AES's key schedule.
2. For i=0, . . . 9 let $K_i$=$K'_i$ and let $K_{10}$=MC*$K'_{10}$. (our "final AES round" will have a mix columns)
3. generate two random 128 bit keys $K_{11}$ and $K_{12}$.

STEP 6: Create Round Affine Mappings
1. Let $A_i$: $\{0,1\}^{408} \to \{0,1\}^{408}$ be defined by $A_i(x)=L_i(x)+b_i$ for i=0, . . . ,19.
2. Round 0:
Generate random 152 bit $v_0$ and a random 152×152 binary matrix $V_0$
Compute $L'_0$=diag ($L_{D_0}$,$V_0$,$L_{D_1}$).
Compute $b'_0$=($K_{D_0}$,$v_0$,$K_{D_1}$).
Compute $L_0=E_0*F*L'_0*L_I$,
and $b_0=E_0*F*b'_0$.
Note that $v_0$ is 152 bits since 51-2*16=19, and 19*8=152. The $L_{D_0}$ represents the ω AES branch, the $L_{D_1}$ represents the σ AES branch and the $V_0$ represents the remaining coefficients.
3. Round 1:
Generate random 152 bit $v_1$ and a random 152×152 binary matrix $V_1$.
Compute $L'_1$=diag (Id,$V_1$,$L_{D_2}$).
Compute $b'_1$=(0,$v_1$,$k_{D_2}$).
Compute $L_1=E_1*F*L'_1*F^{-1}*E_0^{-1}$,
and $b_1=E_1*F*b'_1$.

4. Round 2:
Generate random 152 bit $v_2$ and a random 152×152 binary matrix $V_2$.
Compute $L'_2$=diag ($L_{D_0}^{-1}$,$V_2$,Id).
Compute $b'_2$=($L_{D_0}^{-1}K_{D_0}$+$K_0$,$v_2$,0).
Compute $L_2=E_2*F*L'_2*F^{-1}*E_1^{-1}$,
and $b_2=E_2*F*b'_2$.
5. Round 3:
Generate random 152 bit $v_3$ and a random 152×152 binary matrix $V_3$.
Compute $L'_3$=diag ($M*L_S$,$V_3$,$L_{D_2}^{-1}$).
Compute $b'_3$=($K_1 M*b_S$,$v_3$,$L_{D_2}^{-1}K_{D_2}$).
Compute $L_3=E_3*F*L'_3*F^{-1}*E_2^{-1}$,
and $b_3=E_3*F*b'_3$.
6. Round 4:
Generate random 152 bit $v_4$ and a random 152×152 binary matrix $V_4$.
Compute $L'_4$=diag ($M*L_S$,$V_4$,$L_{D_1}^{-1}$).
Compute $b'_4$=($K_2$+$M*b_S$,$v_4$,$L_{D_1}^{-1}K_{D_1}$+$K_0$).
Compute $L_4=E_4*F*L'_4*F^{-1}*E_2^{-1}$,
and $b_4=E_4*F*b'_4$.
7. Round i=5, . . . ,14:
Generate random 152 bit $v_i$ and a random 152×152 binary matrix $V_i$.
Compute $L'_i$=diag ($M*L_S$,$V_i$,$M*L_S$).
Compute $b'_i$=($K_{i-2}$+$M*b_S$,$v_i$,$K_{i-4}$+$M*b_S$).
Compute $L_i=E_i*F*L'_4*F^{-1}*E_{i-1}^{-1}$,
and $b_i=E_i*F*b'_i$.
8. Round 15:
Generate random 152 bit $v_{15}$ and a random 152×152 binary matrix $V_{15}$.
Compute $L'_{15}$=diag ($L_{D_3}$,$V_{15}$,$M*L_S$).
Compute $b'_{15}$=($K_{D_3}$,$v_{15}$,$K_{11}$+$M*b_S$).
Compute $L_{15}=E_{15}*F*L'_{15}*F^{-1}*E_{14}^{-1}$,
and $b_{15}=E_{15}*F*b'_{15}$.
9. Round 16:
Generate random 152 bit $v_{16}$ and a random 152×152 binary matrix $V_{16}$.
Compute $L'_{16}$=diag (0,$v_{16}$,$K_{12}$+$M*b_S$).
Compute $b'_{16}$=(0,$v_{16}$,$K_{12}$+$M*b_S$).
Compute $L_{16}=E_{16}*F*L'_{16}*F^{-1}*E_{15}^{-1}$,
and $b_{16}=E_{16}*F*b'_{16}$.
10. Round 17:
Generate random 152 bit $v_{17}$ and a random 152×152 binary matrix $V_{17}$.
Generate random 128×128 bit matrix binary B, such that both B and B+Id are invertible.
Compute $$C = \begin{pmatrix} B & 0 & B+Id \\ 0 & Id & 0 \\ 0 & 0 & Id \end{pmatrix}.$$

Compute $L'_{17}$=diag (Id,$V_{17}$,$L_{D_4}$)*C*diag ($L_{D_3}^{-1}$,Id,Id).
Compute $b'_{17}$=($B*L_{D_3}^{-1}K_{D_3}$,$v_{17}$,$K_{D_4}$).
Compute $L_{17}=E_{17}*F*L'_{17}*F^{-1}*E_{16}^{-1}$,
and $b_{17}=E_{17}*F*b'_{17}$.
11. Round 18:
Generate random 152 bit $v_{18}$ and a random 152×152 binary matrix $V_{18}$.
Compute $L'_{18}$=diag ($L_S^{-1}M^{-1}$,$V_{18}$,$L_{D_5}$).
Compute $b'_{18}$=($L_S^{-1}M^{-1}K_{12}$+$L_S^{-1}b_S$,$v_{18}$,$K_{D_5}$).
Compute $L_{18}=E_{18}*F*L'_{18}*F^{-1}*E_{17}^{-1}$,
and $b_{18}=E_{18}*F*b'_{18}$.

12. Round 19:
   Generate random 152 bit $v_{19}$ and a random 152×152 binary matrix $V_{19}$.
   Compute $L'_{19}=\text{diag}(MC^{-1}*L_S^{-1}*M^{-1}, V_{19}, \text{Id})$.
   Compute 128 bit $b'_{19}=(MC^{-1}*L_S^{-1}*M^{-1}*K_{11}+L_S^{-1}*b_S)$.
   Compute 128×408 bit $L_{19}=(\text{Id } 0\ 0)*L'_{19}*F^{-1}*E_{18}^{-1}$, and $b_{19}=b'_{19}$.

STEP 7: Completing the circuit We apply the "inversion" function used in "ShareSbox" described above to compute multiplicative inverses over GF(256) of each Fourier Coefficient. We call this function s here. Then, the final circuit is described as follows:
   Given 128 bit plaintext p.
   Set $x_0 = s \circ A_0(p)$
   For $i=1, \ldots 18$: $x_i = s \circ A_i(x_{i-1})$.
   The 128 bit result $c = A_{19}(x)$.

In the various embodiments of the cryptographic device, the input interface may be selected from various alternatives. For example, input interface may be a network interface to a local or wide area network, e.g., the Internet, a storage interface to an internal or external data storage, a keyboard, an application interface (API), etc. The output interface may be a network interface to a local or wide area network, e.g., the Internet, a storage interface to an internal or external data storage, an application interface (API), a display, a printer, etc. The input and output interfaces may be combined in a communication interface.

The cryptographic device may have a user interface, which may include well-known elements such as one or more buttons, a keyboard, display, touch screen, etc. The user interface may be arranged for accommodating user interaction for performing a cryptographic action, say a decryption.

Memory of device 100, e.g., internal state storage 130, may be implemented as an electronic memory, say a flash memory, or a RAM, or magnetic memory, say hard disk or the like. Storage 130 may comprise multiple discrete memories together making up the memory. The memory may be part volatile, part non-volatile. For example, tables, and computer instructions may be stored in the non-volatile part, and internal states in the volatile part.

Typically, the device 100 comprise a microprocessor (not separately shown in FIG. 1) which executes appropriate software stored at the device 100; for example, that software may have been downloaded and/or stored in a corresponding memory, e.g., a volatile memory such as RAM or a non-volatile memory such as Flash (not separately shown). Alternatively, device 100 may, in whole or in part, be implemented in programmable logic, e.g., as field-programmable gate array (FPGA). Device 100 may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, device 100 comprises one or more or all of: an input interface circuit, an input operator circuit, an output interface circuit, an output operator circuit, an internal state storage circuit, multiple non-linear operation circuits, multiple linear operation circuits. The device 100 may comprise additional circuits. The circuits implement the corresponding units described herein. The circuits may be a processor circuit and storage circuit, the processor circuit executing instructions represented electronically in the storage circuits. The circuits may also be, FPGA, ASIC or the like.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 5A:
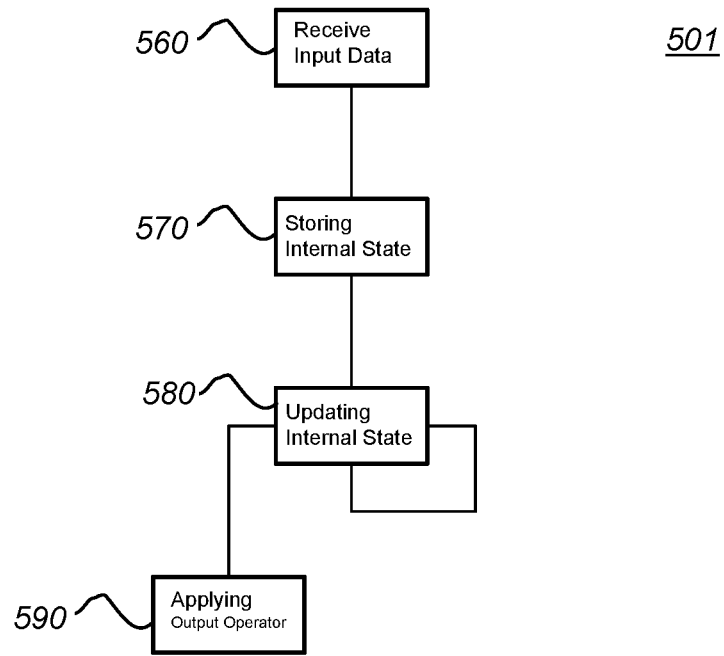

FIG. 5a schematically shows an example of an embodiment of a cryptographic method 501. Method 501 is arranged to perform a cryptographic operation on input data obtaining output data. Cryptographic method 501 comprises
   receiving the input data 560,
   storing 570 an internal state, the internal state comprising one or more data elements, the internal state being represented in the memory as one or more sets of shares, a set of shares in the memory having a corresponding set of Fourier coefficients according to a discrete Fourier transform in a finite field, a proper subset of the Fourier coefficients corresponding to a set of shares determining one or more data elements of the internal state,
   performing the cryptographic operation by repeatedly updating 580 the internal state, an initial internal state being derived from the input data, the output data being derived from a final internal state, an updated internal state being formed by updating the one or more sets of shares representing the internal state, a proper subset of the updated Fourier coefficients corresponding to an updated set of shares determining the one or more updated data elements of the updated internal state,
   applying 590 an output operator to the final internal state to derive the output data, the output operator mapping the one or more sets of shares to the data elements of the output data.

Figure 5B:
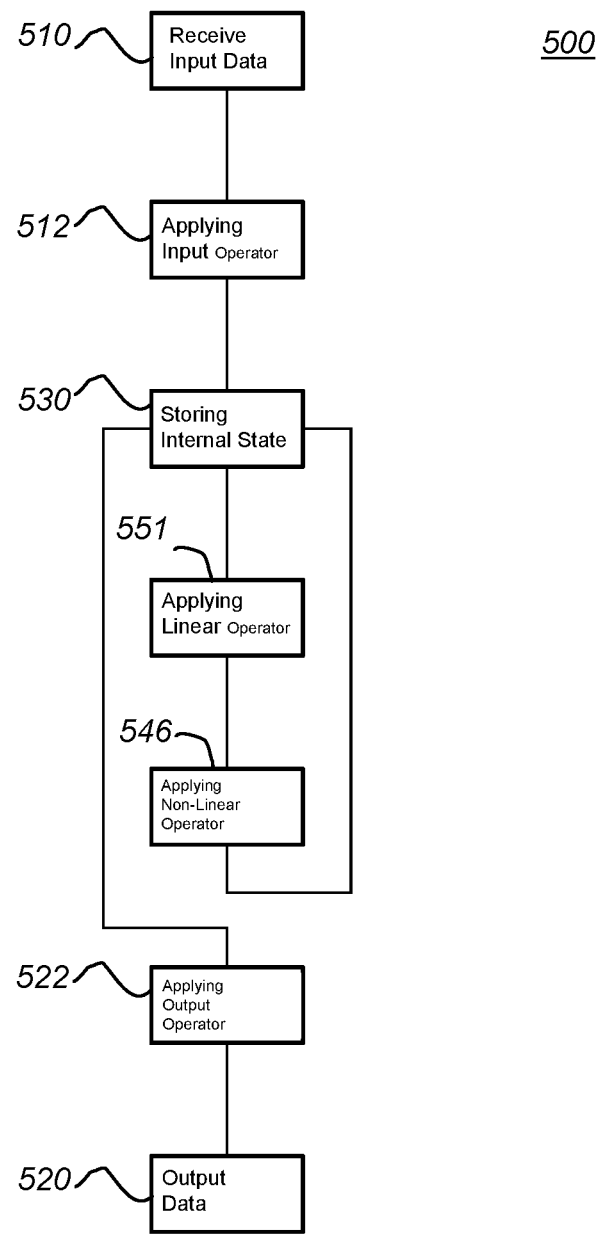

FIG. 5b schematically shows an example of an embodiment of a cryptographic method 500. Method 500 is arranged to perform a cryptographic operation on input data obtaining output data. Method 500 comprises
   receiving 510 the input data,
   applying 512 an input operator to plain input data, said input operator producing multiple sets of shares representing the initial internal state, the multiple sets of shares satisfying the predetermined relationship,
   storing 530 an internal state, the internal state comprising one or more data elements, each data element being represented in the memory as a corresponding set of shares, a set of shares in the memory having a corresponding set of Fourier coefficients according to a discrete Fourier transform in a finite field, the sets of Fourier coefficients corresponding to the sets of shares in the memory satisfying a predetermined relationship among them,
   repeatedly updating the internal state, updating the internal state being arranged so that an updated set of Fourier coefficients corresponding to the share sets of the updated internal state satisfies the predetermined relationship among them as an invariant, the updating comprises applying 541 one or more non-linear operators and/or one or more non-linear operators 546, after the operators are applied the updated internal state is stored again in 530
   applying 522 an output operator to the final internal state to derive the output data, the output operator mapping a set of shares to the data element it represents plus a distortion, said distortion depending on the Fourier coefficients of the set of shares such that the distortion is zero if the Fourier coefficients satisfy the predetermined relationship, For example, the output operator may be applied after a predetermined number of updating rounds have been executed in the internal state, and outputting 520 the output data.

As noted herein, some of the steps in the method are optional; for example, encoding the input data is not needed if it is already encoded.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, updating steps may be executed, at least partially, in parallel; for example, applying non-linear operators to different data elements of the internal state may be done in parallel. Moreover, a given step may not have finished completely before a next step is started.

A method according to the invention may be executed using software, which comprises instructions for causing a processor system to perform an embodiment of a cryptographic method, e.g., method 500 or 501. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 6A:
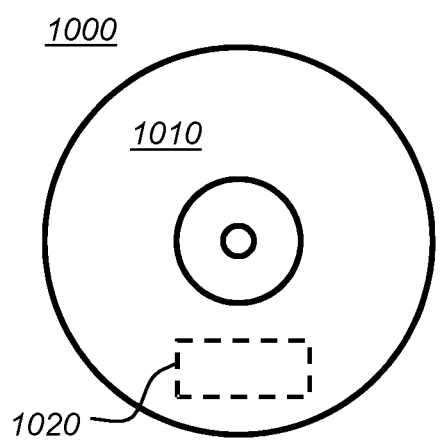

FIG. 6a shows a computer readable medium 1000 having a writable part 1010 comprising a computer program 1020, the computer program 1020 comprising instructions for causing a processor system to perform a cryptographic method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said cryptographic method.

Figure 6B:
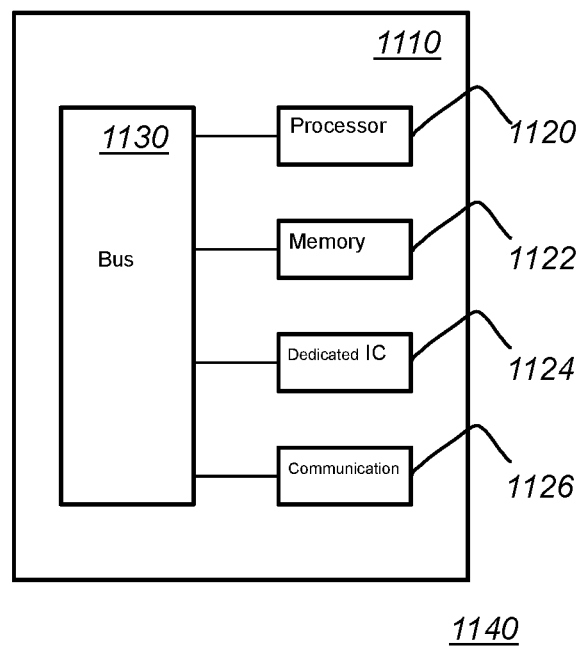

FIG. 6b shows in a schematic representation of a processor system 1140 according to an embodiment of a cryptographic device. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the cryptographic device may comprise a processor circuit and a memory circuit, the processor being arranged to execute software stored in the memory circuit. For example, the processor circuit may be an Intel Core i7 processor, ARM Cortex-R8, etc. In an embodiment, the memory circuit may include a ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

LIST OF REFERENCE NUMERALS, IN FIG. 1-3b 100 a cryptographic device
110 an input interface
112 an input operator
120 an output interface
122 an output operator
130 an internal state storage
141, 142, 143 a non-linear operation
146, 147, 148 a linear operation
210 plain input data 211,212,213,214 an internal state
215 plain output data
310 a plain internal state
311, 312, 313 a data element
320 an internal state represented as a set of shares (unencoded)
321, 322, 323 a set of shares
330 Fourier coefficients for an internal state
331, 332, 333 a set of Fourier coefficients
340 an internal state represented as a set of shares (encoded)
341, 342, 343 a set of encoded shares

The invention claimed is:

1. A cryptographic device comprising:
an input interface circuit, wherein the input interface circuit is arranged to receive an input data,
a memory circuit,
  wherein the memory circuit is arranged to store an internal state,
  wherein the internal state comprises one or more data elements,
  wherein each data element is represented in the memory circuit as a set of shares,
  wherein each set of shares in the memory circuit has a corresponding first set of first Fourier coefficients,
  wherein the first Fourier coefficients are calculated according to a discrete Fourier transform in a finite field,
  wherein a predetermined relationship between the first Fourier coefficients is satisfied,
a processor circuit,
  wherein the processor circuit is arranged to perform a cryptographic operation by repeatedly updating the internal state,
  wherein an initial internal state is derived from the input data,
  wherein an output data is derived from a final internal state,
  wherein the predetermined relationship is satisfied within an updated set of updated Fourier coefficients if the predetermined relationship is between each first set of the first Fourier coefficients is satisfied,
  wherein each of the updated sets of updated Fourier coefficients corresponds to at least one of the share sets of the updated internal state,
wherein the processor circuit is arranged to apply an output operator to the final internal state so as to derive the output data,
wherein the output operator maps a set of shares to the data element it represents plus a distortion,
wherein the distortion is zero if the first Fourier coefficients satisfies the predetermined relationship and the distortion depends on the first Fourier coefficients.

2. The cryptographic device as in claim 1,
wherein a set of shares represents a data element,
wherein the data element is determined by a subset of the first Fourier coefficients.

3. The A cryptographic device as in claim 1,
wherein a set of shares represents a data element.
wherein the data element is equal to one of the first Fourier coefficients.

4. The cryptographic device as in claim 1,
wherein the predetermined relationship comprises a requirement,
wherein the requirement is that at least two Fourier coefficients of different sets of Fourier coefficients are equal.

5. The cryptographic device as in claim 4,
wherein the first sets of first Fourier coefficient comprises a second set of second Fourier coefficients and third set of third Fourier coefficients,
wherein each of the second Fourier coefficients, except one, is equal to a respective third Fourier coefficient.

6. The cryptographic device as in claim 3,
wherein updating the internal state comprises applying non-linear operations to the data elements,
wherein a non-linear operation is arranged to act on a data element of the internal state by acting on shares in the memory circuit in the corresponding set of shares that represents the data element,
wherein the same non-linear operation acts on the sets of shares corresponding to the data elements.

7. The A cryptographic device as in claim 6,
wherein the non-linear operation is a polynomial in the finite field,
wherein the processor circuit is arranged to compute powers of a share set as convolutions of the share set with itself.

8. The cryptographic device as in claim 1,
wherein updating the internal state comprises applying linear operations to the internal state,
wherein the linear operation is applied simultaneously to at least two sets of shares in the memory circuit,
wherein the at least two sets of shares in the memory circuit represent at least two data elements of the internal state.

9. The cryptographic device as in claim 8,
wherein the linear operation is constructed by concatenating a Fourier operator, one or more linear operators and an inverse Fourier operator,
wherein the Fourier operation is arranged to produce at least one of the first set of first Fourier coefficients for each set of shares on which the linear operation acts,
wherein the one or more linear operators are arranged to act the Fourier coefficients so as to preserve the predetermined relationship.

10. The cryptographic device as in claim 9,
wherein the first sets of first Fourier coefficients are ordered,
wherein the first Fourier coefficients in the set have an index,
wherein the one or more linear operators act on the first Fourier coefficients of the same index independent of first Fourier coefficients of a different index.

11. The cryptographic device as in claim 1,
wherein each first set of first Fourier coefficients comprises one or more representing Fourier coefficients and one or more protective Fourier coefficients,
wherein the one or more representing Fourier coefficients represent the data element,
wherein the output operator is constructed by concatenating one or more protective operators,
wherein at least one of the one or more protective operators map the one or more protective Fourier coefficients to the distortion.

12. The cryptographic device as in claim 11,
wherein the output operator is constructed by concatenating a decoding operator, a Fourier transform a first operator and a protective operator,
wherein the decoding operator is arranged to remove an encoding of the final internal state, wherein the Fourier transform is arranged to transform the final internal state to the first sets of first Fourier coefficients corresponding to the sets of shares mapped by the output operator, wherein the first operator maps the first Fourier coefficients corresponding to the data element, to the corresponding data element.

13. The A cryptographic device as in claim 1, wherein performing the cryptographic operation comprises adding a key to all or part of the internal state, wherein the key is represented in the memory circuit as a corresponding set of shares, wherein the set of shares satisfies the predetermined relationship between the first Fourier coefficients corresponding to the set of shares of the key.

14. The cryptographic device as in claim 1, wherein the combined bit size of at least one of the first sets of shares is at least as large as the bit-size of the input data.

15. The cryptographic device as in claim 1, wherein the cryptographic operation is a block cipher.

16. The cryptographic device as in claim 1, wherein the shares in at least one of the first set of shares represent a data element which is encoded with linear encodings.

17. The A cryptographic device as in claim 1, wherein the processor circuit is arranged to apply an input operator to plain input data, wherein the input operator is arranged to produce multiple sets of shares representing the initial internal state, wherein the multiple sets of shares satisfy the predetermined relationship.

18. An electronic cryptographic method comprising
receiving an input data,
storing an internal state,
wherein the internal state comprises one or more data elements,
wherein each data element is represented in the memory as a corresponding set of shares,
wherein each set of shares in the memory circuit has a corresponding first set of first Fourier coefficients,
wherein the first Fourier coefficients are calculated according to a discrete Fourier transform in a finite field,
wherein a predetermined relationship between the first Fourier coefficients is satisfied,
performing a cryptographic operation by repeatedly updating the internal state,
wherein an initial internal state is derived from the input data,
wherein an output data is derived from a final internal state,
wherein the predetermined relationship is satisfied within an updated set of updated Fourier coefficients if the predetermined relationship is between each first set of the first Fourier coefficients is satisfied,
wherein each of the updated sets of updated Fourier coefficients corresponds to at least one of the share sets of the updated internal state,
applying an output operator to the final internal state to so as derive the output data,
wherein the output operator maps a set of shares to the data element it represents plus a distortion,
wherein the distortion is zero if the first Fourier coefficients satisfies the predetermined relationship and the distortion depends on the first Fourier coefficients.

19. A computer program stored on a non-transitory medium, wherein the computer program when executed on a processor performs the method as claimed in claim 18.

20. The method as in claim 18,
wherein the predetermined relationship comprises a requirement,
wherein the requirement is that at least two Fourier coefficients of different sets of Fourier coefficients are equal.

* * * * *